United States Patent
Jensen et al.

(10) Patent No.: US 9,316,473 B2
(45) Date of Patent: Apr. 19, 2016

(54) SURFACE SENSING DEVICE WITH OPTICAL MONITORING SYSTEM

(75) Inventors: Thomas Jensen, Rorschach (CH); Knut Siercks, Moerschwil (CH)

(73) Assignee: LEICA GEOSYSTEMS AG, Heerbrugg (CH)

(*) Notice: Subject to any disclaimer, the term of this patent is extended or adjusted under 35 U.S.C. 154(b) by 127 days.

(21) Appl. No.: 13/643,463

(22) PCT Filed: Apr. 27, 2011

(86) PCT No.: PCT/EP2011/056689
§ 371 (c)(1),
(2), (4) Date: Nov. 16, 2012

(87) PCT Pub. No.: WO2011/138206
PCT Pub. Date: Nov. 10, 2011

(65) Prior Publication Data
US 2013/0050701 A1   Feb. 28, 2013

(30) Foreign Application Priority Data
May 5, 2010 (EP) .................................. 10162017

(51) Int. Cl.
*G01J 4/00* (2006.01)
*G01B 5/012* (2006.01)
*G01B 11/00* (2006.01)

(52) U.S. Cl.
CPC .............. *G01B 5/012* (2013.01); *G01B 11/007* (2013.01)

(58) Field of Classification Search
CPC ........ G01B 11/24; G01B 5/012; G01B 5/008; G01B 11/14; G01B 5/28; G01B 11/00; G01N 21/86
USPC ........................... 356/614, 369, 237.2–237.6; 250/559.29; 33/503, 561
See application file for complete search history.

(56) References Cited

U.S. PATENT DOCUMENTS

| 3,164,663 A | * | 1/1965 | Gale | .................. | G01N 21/8507 250/227.23 |
| 3,448,277 A | * | 6/1969 | Jayko | ................. | G01N 21/8507 250/573 |

(Continued)

FOREIGN PATENT DOCUMENTS

| DE | 4244240 | 12/1992 |
| DE | 42 44 240 A | 6/1994 |

(Continued)

OTHER PUBLICATIONS

European Search Report completed Jul. 26, 2010 in priority European Patent Application No. EP 10 16 2017.

*Primary Examiner* — Tarifur Chowdhury
*Assistant Examiner* — Isiaka Akanbi
(74) *Attorney, Agent, or Firm* — Maschoff Brennan

(57) ABSTRACT

A surface sensing device comprising an optical monitoring system for measuring a displacement of the tip a hollow stylus with respect to a stylus carrier. According to the invention, the light emitting means of the optical monitoring system are built in such a way that the beam has at least two distinguishable light characteristics with a given characteristics distribution. The optical monitoring system further comprises an optically encoding component positioned in the stylus carrier in the optical return path and designed to transform the information of an impinging position of the returned beam upon the optical encoding component into a change of the characteristics distribution of the returned beam, and the detector means is sensitive for the at least two distinguishable light characteristics and built for generating the electrical output signal dependent on the changed characteristics distribution of the returned beam.

27 Claims, 29 Drawing Sheets

(56) References Cited

U.S. PATENT DOCUMENTS

| | | | |
|---|---|---|---|
| 4,984,959 A | | 1/1991 | Kato |
| 5,040,306 A | * | 8/1991 | McMurtry ............ G01B 7/008 33/503 |
| 5,103,572 A | | 4/1992 | Ricklefs |
| 5,118,956 A | | 6/1992 | Dunning et al. |
| 5,327,657 A | * | 7/1994 | Hajdukiewicz et al. ........ 33/503 |
| 5,390,424 A | | 2/1995 | Butter et al. |
| 6,112,423 A | * | 9/2000 | Sheehan ......................... 33/502 |
| 6,633,051 B1 | | 10/2003 | Holloway et al. |
| 6,694,634 B2 | * | 2/2004 | Sato et al. ....................... 33/503 |
| 6,789,327 B2 | * | 9/2004 | Roth et al. ...................... 33/556 |
| 7,614,157 B2 | | 11/2009 | Granger |
| 8,006,398 B2 | * | 8/2011 | McFarland et al. ............ 33/503 |
| 8,144,340 B2 | | 3/2012 | McFarland et al. |
| 2008/0257023 A1 | * | 10/2008 | Jordil et al. ..................... 73/105 |
| 2011/0043827 A1 | * | 2/2011 | McFarland et al. ........... 356/614 |
| 2011/0080588 A1 | * | 4/2011 | Segall ............................ 356/445 |

FOREIGN PATENT DOCUMENTS

| | | |
|---|---|---|
| GB | 2 220 748 A | 1/1990 |
| JP | 03-223609 A | 10/1991 |
| JP | 05-087548 A | 4/1993 |
| JP | 2004-012244 | 1/2004 |
| JP | 2004-012244 A | 1/2004 |
| JP | 2008-537134 A | 9/2008 |
| WO | 89/07745 | 8/1989 |
| WO | 2006/114567 A1 | 11/2006 |
| WO | 2006/114627 A1 | 11/2006 |

* cited by examiner

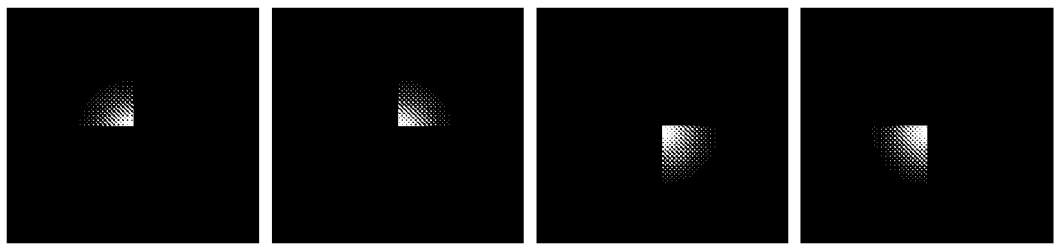
If$_0 \cdot \frac{255}{\max(\text{If}_0)}$  If$_1 \cdot \frac{255}{\max(\text{If}_1)}$  If$_2 \cdot \frac{255}{\max(\text{If}_2)}$  If$_3 \cdot \frac{255}{\max(\text{If}_3)}$
Fig. 27a  Fig. 27b  Fig. 27c  Fig. 27d
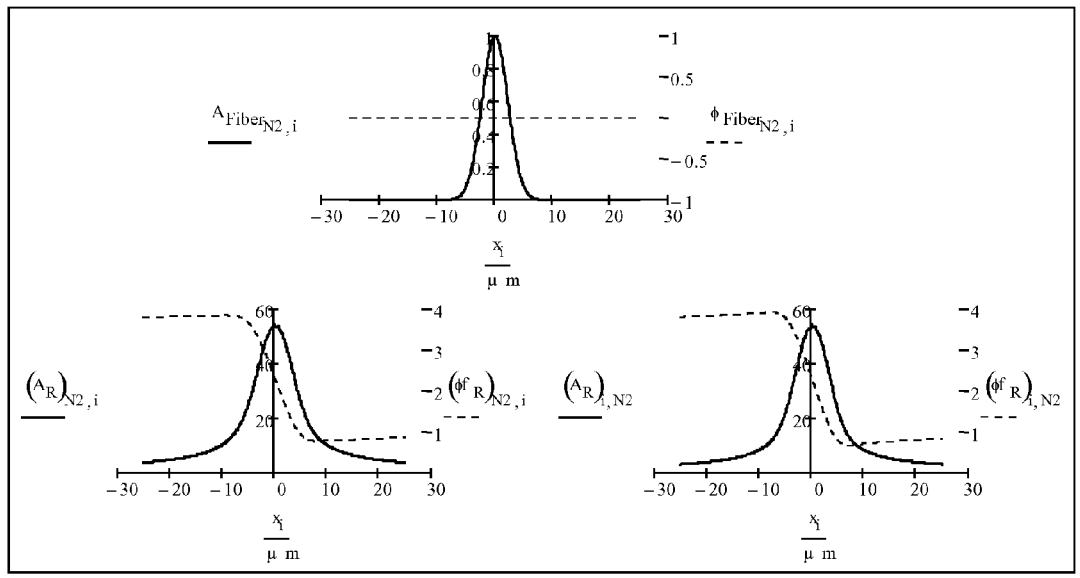
Fig. 28
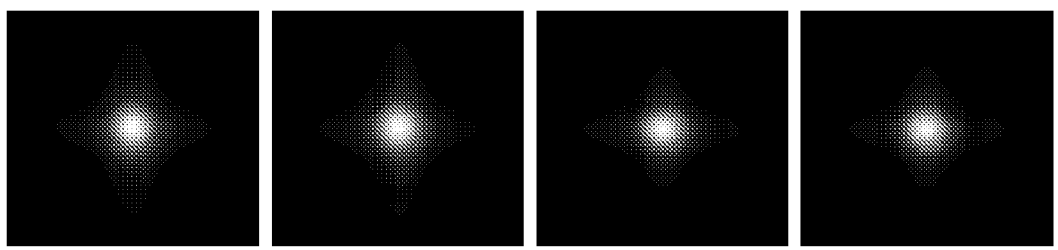
If$_0 \cdot \frac{255}{\max(\text{If}_0)}$  If$_1 \cdot \frac{255}{\max(\text{If}_1)}$  If$_2 \cdot \frac{255}{\max(\text{If}_2)}$  If$_3 \cdot \frac{255}{\max(\text{If}_3)}$
Fig. 29a  Fig. 29b  Fig. 29c  Fig. 29d

$$cal := \frac{100\mu m}{255\mu m} = 0.392$$

$$x_S := \frac{\sum_r \left(P_{fiber_r} \cdot pos_{r,0} \cdot cal\right)}{\sum_r P_{fiber_r}} = 80.256 \, \mu m \qquad y_S := \frac{\sum_r \left(P_{fiber_r} \cdot pos_{r,1} \cdot cal\right)}{\sum_r P_{fiber_r}} = 99.595 \, \mu m$$

SURFACE SENSING DEVICE WITH OPTICAL MONITORING SYSTEM

FIELD OF THE INVENTION

The invention relates to a surface sensing device dedicated for use in position determining apparatus, in particular in a coordinate measuring machine (CMM) or a scanning machine. The device comprises a basis and a probe head for establishing a contacting or contactless measurement connection to a surface to be measured. The probe head is moveably linked to the basis by at least one joint and comprises a hollow stylus with stylus length and a stylus tip. The surface sensing device further comprises an optical monitoring system for measuring a displacement of the stylus tip with respect to the stylus carrier.

The optical monitoring system comprises light emitting means, i.e. at least one light source for generating a beam to be directed inside the stylus towards the stylus tip, where at least parts of the beam are reflected as a returned beam propagating along an optical return path.

Additionally, the optical monitoring system is provided with detector means for the returned beam being capable of generating an electrical output signal indicative of the displacement of the stylus tip.

BACKGROUND

Coordinate measuring machines (CMM) are used to determine the three-dimensional topography of an object. CMM typically comprise an arm movable in three directions (X, Y, Z) relative to a table supporting the object. Movement of the arm in any of these directions and thus the actual position of the arm with respect to the object is measured with suitable transducers.

For measuring the surface variations, measurement principles based on use of tactile sensors and of optical sensors are known.

In international patent application No. WO 89/07745, a probe head for use in coordinate measuring machines is disclosed. The probe head comprises a stylus which is supported for axial and angular displacements. A transducer senses axial forces on the sensing end of the stylus due to engagement of the stylus end with a workpiece. A strain gauge system provided on the stylus senses transverse forces on the sensing end of the stylus. The axial and transversal forces are used to determine the orientation of the surface of the workpiece, and a control system is described which responds to those forces to maintain the stylus normal to the workpiece surface during a scanning operation.

From the signals provided by the measuring transducers and from knowledge of the dimensions of the parts of the surface sensing device, a prediction can be made about the position of the centre of the stylus tip.

However, the stylus assembly is subject to bending due to contact with the workpiece surface and due to inertial forces while accelerating, and this bending makes the actual position of the centre of the stylus tip uncertain.

In U.S. Pat. No. 5,118,956, a scanning probe tip is disclosed, which is provided with a sensor, such as a mirror, an optical fiber or a bi-refringent element which changes state by vibrating or undergoing strain when a stylus connected to the probe contacts a workpiece. The sensor is provided on the stylus (in the case of the mirror) or in the stylus (in the case of the optical fiber). The change of state of the sensor due to surface contact with a workpiece causes a change in the path length, polarization state, or intensity of light waves conveyed by the sensor. As an example, an interferometer for detection of such changes is disclosed. Probe beams directed to the object to be investigated and returned beams may be propagated in optical fibers from the light source to the object and be returned in optical fibers to a detector. Optical sensors are not used to detect deformations or vibrations of the stylus by itself. Moreover the optical sensors replace classical electrical transducers.

As a disadvantage, this sensing configuration requires the recording of the variation of an interference pattern over a significant amount of time and/or the use of large-area, high-resolution position-sensitive detectors. Additionally a calibration of a change in interference patterns to the extent of stylus displacement and/or bending is difficult, as typically interference patterns are hardly exactly reproducible.

Scanning measurements based on tactile sensors, i.e. a workpiece-contacting tip, are generally associated with a principle problem. If the stylus is designed very inflexible/stiff, the sensing tip/sensor head has to follow the surface variations of an object very precisely in order to ensure even or equal and continuous contact with the object for an exact determination of the surface topography. Because of the relatively large inertia of the measuring head due to its mass, very smooth or even polished surfaces and/or low scanning velocities would be required for exact measurements. If, in contrast, the stylus is designed very flexible/easily deformable, scanning velocities could be increased, but the measurement head/sensor would deliver only a smoothened/approximated representation of the object surface as a measurement result.

In U.S. Pat. No. 6,633,051 a solution is proposed where a relatively stiff stylus carrier of trumpet-like shape is connected with a relatively thin, low-mass and flexible stylus, in order to ensure high eigen frequencies of the system formed by stylus and stylus carrier combined with high flexibility of the stylus, i.e. the possibility of high scanning velocities. A probe beam from a laser light source is directed within the stylus to the tip where it impinges on a retro-reflector. A deflection of the stylus tip leads to a displacement of the reflected/returned beam and is measured/recorded with a position-sensitive detector housed in the stylus carrier. Thus, the optical monitoring system comprising the excitation light source and the detector fulfils the functionality of the tactile measurement system.

As a disadvantage of the system configuration disclosed in U.S. Pat. No. 6,633,051, the optical monitoring system including laser diode, detector and driver electronics is mounted in the stylus carrier, thus enclosing several heat sources in the closed frame formed by the stylus and its carrier.

The development of heat leads to an uncontrollable deformation of the measurement system as long as thermal equilibrium is not reached.

An essential advantage of such coordinate measuring machines is their high flexibility of operation due to a fast, often even automated exchange of the measuring probes, i.e. exchange of stylus shape and length for optimum adaptation to the object to be scanned. Any exchange of the stylus leading to a change in the thermal equilibration conditions, the inclusion of any heat sources in the frame formed by the stylus and the stylus carrier has to be avoided.

Both for CMM comprising tactile sensors and CMM equipped with optical sensors, provision of an optical monitoring system is necessary if, in case of strong acceleration forces acting on optical sensors bending of the stylus, or in case of scanning tactile measurements fast deformations of the stylus occur.

Thereby, two effects have to be considered and compensated: First, a hollow stylus of significant length, such as a carbon stylus of 300 mm length and 5 mm diameter, is subjected to a static bending by about 80 μm upon horizontal orientation due to gravitational force. Additionally, this static bending deviates slightly from rotational symmetry because of eccentricity of the internal bore and material inhomogeneities of the order of some micrometers. As a second effect, in scanning measurements a dynamic bending of the stylus caused by additional acceleration forces does occur which can reach a similar amount as the static bending and which can add to or compensate the static bending. Furthermore, the stylus end can be subjected to vibrational cross-talk from actuation of the CMM.

Upon equipment with an optical monitoring system, in contrast to the configuration disclosed in U.S. Pat. No. 6,633,051, an inclusion of heat sources, i.e. of electrical power consuming devices as potential sources of further disturbing deformations, in the closed measurement system comprising stylus and stylus carrier should be avoided.

SUMMARY

It is an objective of the invention to provide a surface sensing device, in particular for CMM or scanning machines based on optical or tactile sensors, which shall be equipped with an optical monitoring system without generation of heat in the measurement system.

In particular, it is an objective to provide a technical solution for transmission of a signal originating from the sensing stylus tip indicative for a displacement of the stylus tip or a bending of the stylus to a remote detector, wherein a transmitted signal or signal change shall easily and with high accuracy be scalable to an associated amount of stylus displacement or bending. In the following, a displacement of the stylus tip and a bending of the stylus are summarized as a "displacement of the stylus tip".

A solution of this task has to satisfy the following technical boundary conditions:
  Capability for measurement of dynamic deformations (bending) of the stylus in the range of some kHz, thus allowing for registration of small vibration excitation caused by actuation of the CMM and of movable mechanical axes of the measurement head;
  Determination of a deformation of the measuring tip with a precision of about 100 nm;
  No significant generation of heat or power consumption within the sensing probe and the stylus carrier (below 1 mW);
  Compatibility with an opto-mechanical interface, i.e. capability for signal transmission by an optical monomode fiber;
  No disturbance in the optical path of the returned beam of the optical transmission of optical sensor signals;
  Compatibility of the solution with use of both tactile and optical sensors.

The above objectives and tasks are solved by a surface sensing device according to the invention, provided with a basis and a probe head for establishing a contacting or contactless measurement of a surface to be measured. The probe head is moveably linked to the basis by at least one joint and comprises a hollow stylus with stylus length and a stylus tip. The surface sensing device further comprises an optical monitoring system for measuring a displacement of the stylus tip with respect to the stylus carrier.

The optical monitoring system comprises light emitting means, i.e. at least one light source for generating a beam to be directed inside the stylus towards the stylus tip, where at least parts of the beam are reflected as a returned beam propagating along an optical return path.

Additionally, the optical monitoring system is provided with detector means for the returned beam being capable of generating an electrical output signal indicative of the displacement of the stylus tip.

The light emitting means can be a single light source such as a laser, laser diode or super-luminescent light-emitting diode (SLED), but may also be constituted by a multitude of such light sources. As one characterizing feature of the invention, the "light emitting means" is built in such a way that an emitted light has at least two different, distinguishable light characteristics with a given characteristics distribution. Such different, distinguishable light characteristics, which are combined to a probe beam that is directed inside the stylus towards the sensing stylus tip, may, for example, be light components of different discrete wavelengths emitted by different laser light sources, or light with an emission band separable into discrete spectral sub-ranges like light typically emitted by a super-luminescent light-emitting diode (SLED), with a bandwidth of the order of 10 nm.

At the stylus tip, at least parts of the probe beam are returned and propagated back as a returned beam. The returned beam contains information about any displacement of the stylus tip or bending of the stylus, this information being e.g. provided in a displacement of the optical path of the returned beam.

As another characteristic feature of the invention, an optically encoding component, positioned in the stylus carrier in the optical return path, is provided as a further part of the optical monitoring system, typically placed in an optical path between the stylus carrier and the stylus tip. The optically encoding component is designed to transform the information about a displacement of the stylus tip, which will typically be a lateral displacement, or about a bending of the stylus, received at that optically decoding component e.g. in form of a displacement of optical path of the returned beam, into a change in the distribution between fractions of the distinguishable light components or light characteristics for a displaced returned beam compared with a corresponding distribution for a not displaced returned beam. In other words: The information of an impinging position of the returned beam upon the optically encoding component is transformed into a change of the characteristics distribution of the returned beam. The returned beam distributed in fractions of distinguishable light components is further directed to the detector means as part of the optical monitoring system. The detector means is sensitive for the at least two distinguishable light characteristics and built for generating the electrical output signal dependent on the changed characteristics distribution of the returned beam.

It is preferred that the optically encoding component is designed in such a way that the characteristics distribution of the returned beam is modified dependant on the impinging position of the returned beam upon the optically encoding component, so that the returned beam with the modified characteristics distribution propagating from the optically encoding component to the detector means is indicative of the displacement of the stylus tip independent from an exact propagation pathway of the returned beam within the optical return path. Thus, optical waveguiding of the returned beam with the modified characteristics distribution to the detector means by an optical fiber is enabled, without loosing optical indication of the displacement of the stylus tip carried by the returned beam.

As a preferred embodiment of the invention, the surface sensing device is provided as a coordinate measuring machine, in particular as a CMM with an articulated arm, one end thereof forming the basis and the other end thereof having attached the probe head. It is preferred that the light emitting means comprise one or more laser light sources and the detector means comprise one or more detectors. Furthermore it is preferred that the light emitting means and the detector means are positioned outside the probe head, most preferably housed in the basis of the sensing device.

The beam generated by the light emitting means as well as the returned beam propagating from the optically encoding component to the detector means are preferably waveguided in the articulated arm by optical fibers. It is preferred in particular that the beam is out-coupled out of and the returned beam is in-coupled into a transmission fiber by using a circulator as a beam-guiding device.

The transmission optical fiber may be provided for directing the probe beam from the at least one light source to a beam-guiding device, such as a circulator or a fusion coupler in combination with optical insulators, operable to direct the probe beam into a first optical fiber ("probe beam fiber") provided with a first optical fiber collimator for out-coupling a collimated beam to be further propagated as an optical free beam towards the sensing tip of the stylus.

A second optical fiber collimator may be provided for coupling the returned beam into a second optical fiber ("returned beam fiber") and guiding the returned beam towards the beam-guiding device, where it is coupled into the optical transmission fiber for transmission to the detector.

Preferably, the optical transmission fiber and the first and second optical fibers are monomode optical fibers.

In order to enhance the fraction of returned light and to limit detection of optical path displacements of the returned beam to displacement of only the stylus tip or only bending of the stylus, it is preferred that an optical component is mounted adjacent to the sensing tip to return the beam substantially insensitive to tilting of the sensing tip, said optical component being preferably provided as a retro-reflector.

In a preferred embodiment of the invention, the at least two distinguishable light characteristics are given by light components of the generated beam having different wavelengths or wavelength ranges and/or different polarization states, and the characteristics distribution is given by a proportion or fraction of each light component.

It is preferred that the optical encoding component comprises a segmented optical filter with at least two segments of different, preferably spectrally non-overlapping, transmission characteristics. The filter may be located in the entrance pupil plane of the second optical fiber collimator in the returned light beam path. The segmented optical filter may have any shape of its cross-section perpendicular to the direction of propagation of the returned beam; however, a symmetric shape like a circular or a quadratic shape, for example with a cross-sectional surface area of 2 mm×2 mm, is preferred.

The different transmission characteristics of filter segments may concern different transmission for different light polarization states, but are preferably related to different spectral transmission, i.e. that the segmented optical filter is a chromatic filter, preferably provided with spectrally non-overlapping transmission windows with spectral distance of 100 or 200 GHz, i.e. 0.8 nm or 1.6 nm in the C- and L-band, corresponding to the ITU norm of telecommunication. Of course, the transmission characteristics of the filter segments have to be selected in accordance with the emission wavelengths of the light source(s) for generation of the probe beam (and vice versa).

The optically encoding component may also comprise an optical component capable of a locally varying deflection of the returned beam in a direction perpendicular to the direction of propagation of the returned beam.

The optically encoding component may also comprise a "channel" (segment) designed for signal transmission for an interferometric distance measurement for determining changes of the stylus length.

For purposes of easy production, the segmented optical filter may comprise four segments. However, any other kind of segmentation may be realized, the individual segments preferably being designed for equal relative transmission with regard to intensity for light components launched in the case of a not displaced returned beam.

The segmented optical filter may be a segmented dielectric interference filter. Dielectric interference filters are known for their sharp separation between spectral rejection and transmission of an in-coming polychromatic light beam, in contrast for example to colored-glass filters with relatively shallow slopes. The segmented optical filter may be manufactured by conglutinating segments of different transmission together which may be advantageous for production in small series. Different glass plates would be provided with different coatings, sawed, and then pieces from different coating runs would be combined to a segmented filter, all manufacturing steps being standard processing steps.

For production of larger series, manufacturing of segmented filters in a wafer process, including deposition of the coatings in the course of an adequate number of masking steps, could be advantageous. Such a manufacturing method would avoid the step of conglutinating individual segments.

Further advantageous embodiments of a surface sensing device are disclosed and described with reference to the figures and in the dependent claims.

A further subject of the invention is a probe head for a surface sensing device according to the invention, the probe head being formed for establishing and maintaining a contacting or contactless measurement connection to a surface to be measured, wherein the probe head comprises a stylus carrier and a hollow stylus with a stylus tip. As a characterizing feature, the probe head comprises means for receiving a beam, the beam having at least two distinguishable light characteristics with a given characteristics distribution, from the surface sensing device waveguided by an optical fiber. The probe head further comprises means for coupling out the beam out of the optical fiber and directing the beam inside the stylus towards the stylus tip, where at least parts of the beam are reflected as a returned beam propagating along an optical return path. Furthermore, the probe head comprises an optically encoding component as part of an optical monitoring system for measuring a displacement of the stylus tip with respect to the stylus carrier. The optically encoding component is positioned in the stylus carrier in the optical return path and designed to transform the information of an impinging position of the returned beam upon the optically encoding component into a change in the characteristics distribution of the returned beam. The probe head also comprises means for coupling-in the returned beam, having a changed characteristics distribution, into an optical fiber, so as to enable for optical waveguiding of the returned beam in the surface sensing device.

Preferred embodiments of the probe head according to the invention additionally include a beam distributor comprising a beam splitter and/or a circulator connected to a transmission fiber and to a first optical fiber and a second optical fiber. In this embodiment, the circulator is used for injection of light, from at least one light source capable of emitting at least two distinguishable light components and received from the transmission fiber (119), into the first optical fiber connected to a first optical fiber collimator, and for injection of light returned from the sensing tip of the stylus and received from a second optical fiber connected to a second optical fiber collimator into the optical transmission fiber.

Another subject of the invention is a monitoring method for a probe head of a surface sensing device, the probe head comprising a stylus carrier and a hollow stylus with a stylus tip. The monitoring method is designed for measuring a displacement of the stylus tip with respect to the stylus carrier. The method comprises directing a beam, having at least two distinguishable light characteristics with a given characteristics distribution, inside the stylus towards the stylus tip where at least parts of the probe light beam are returned as a returned beam with an optical return path;

transforming information of an impinging position of the returned beam upon an optically encoding component positioned in the stylus carrier in the optical return path into a change in the characteristics distribution of the returned beam-detecting the at least two distinguishable light characteristics of the returned beam, and determining the displacement of the stylus tip with respect to the stylus carrier dependent on the changed characteristics distribution of the returned beam. Thereby it is preferred that, after the transformation step, the returned beam is waveguided by an optical fiber.

SHORT DESCRIPTION OF THE FIGURES

FIG. 1 shows an assembly of a stylus carrier 1 and a hollow stylus 2 dedicated for use in combination with a tactile sensing probe provided with an object-contacting tip 9, according to the state-of-the-art (U.S. Pat. No. 6,633,051).

In FIG. 2a is illustrated a segmented chromatic filter 100 as an example for an optically encoding component.

FIG. 3 shows schematically adequate transmission ranges of the segments of a segmented chromatic filter according to FIG. 2a.

Figure 2A:
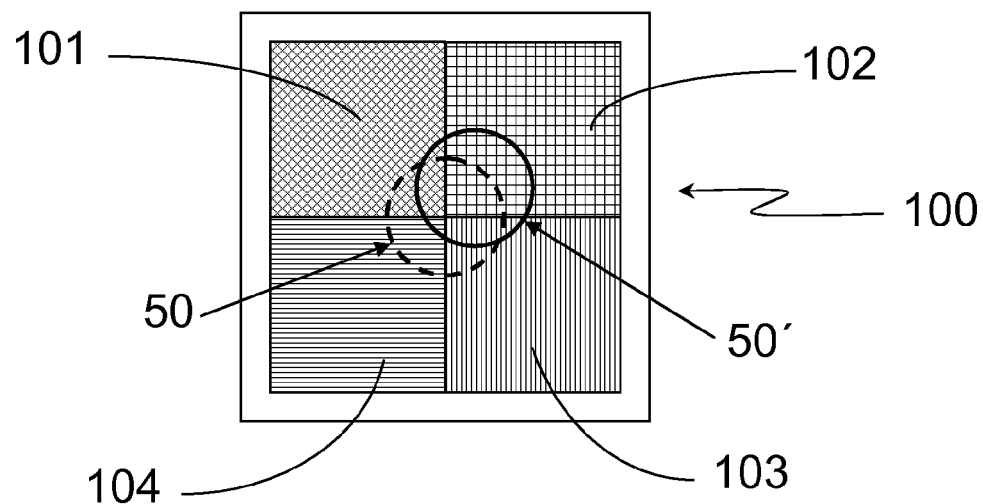
FIG. 2b shows an alternative embodiment of a segmented chromatic filter 200 as a second example for an optically encoding element.
Figure 3:
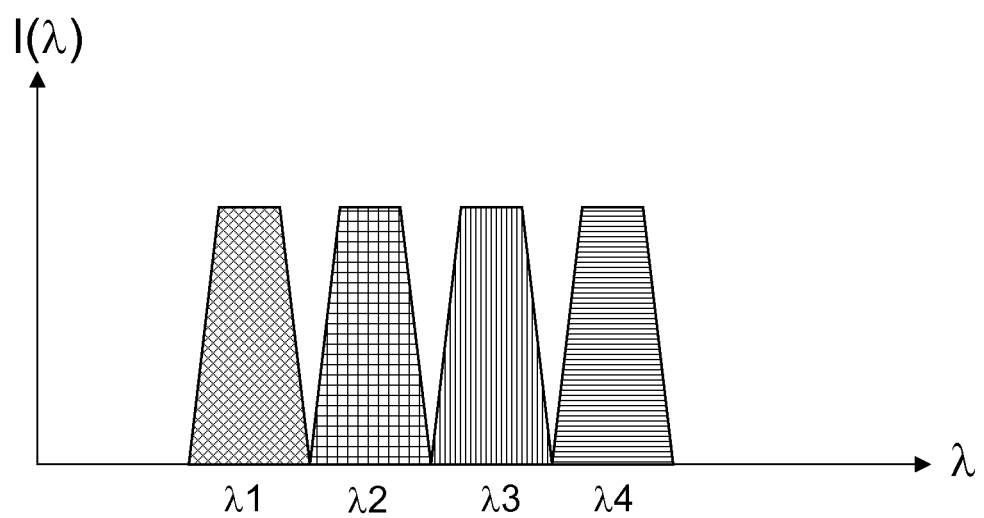
Figure 4A:
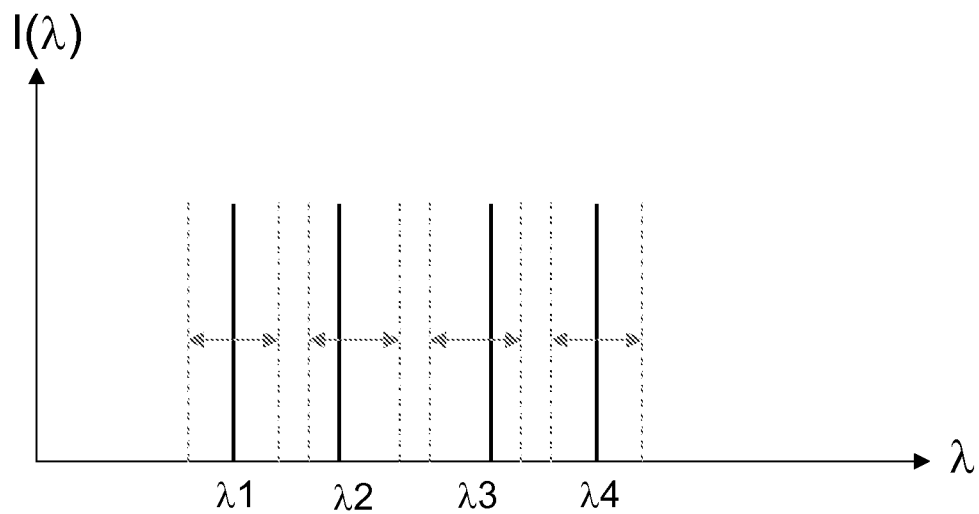
Figure 4B:
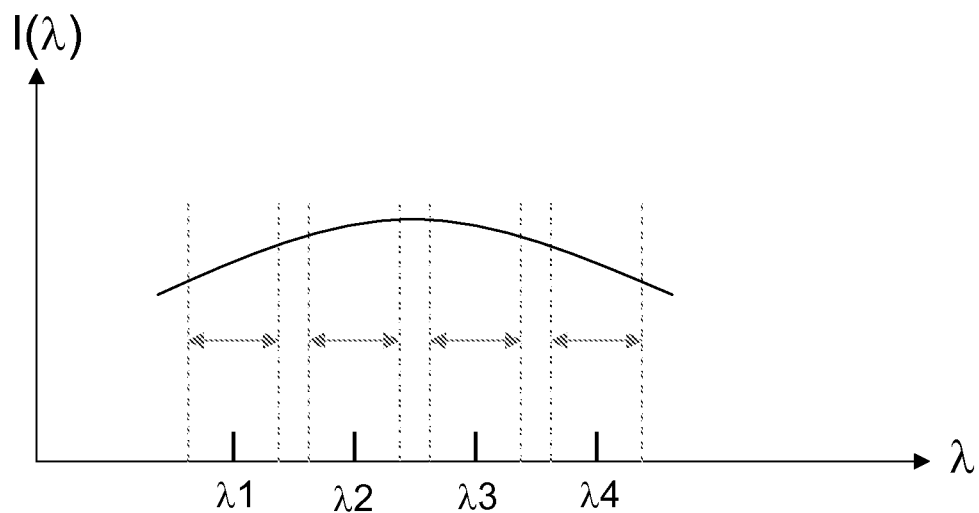

FIG. 4a and FIG. 4b illustrate the selection of light sources, their emission wavelength being correlated with the selection of a segmented chromatic filter according to FIG. 2a and FIG. 3 to be used in combination therewith. FIG. 4a indicates the emission lines (intensities $I(\lambda)$) of four selected individual lasers. FIG. 4b shows a typical spectral distribution of the light emitted by a super-luminescent light-emitting diode (SLED) chosen in such a way that its emission spans the transmission windows of the segmented chromatic filter according to FIG. 2a and FIG. 3.

Figure 5:
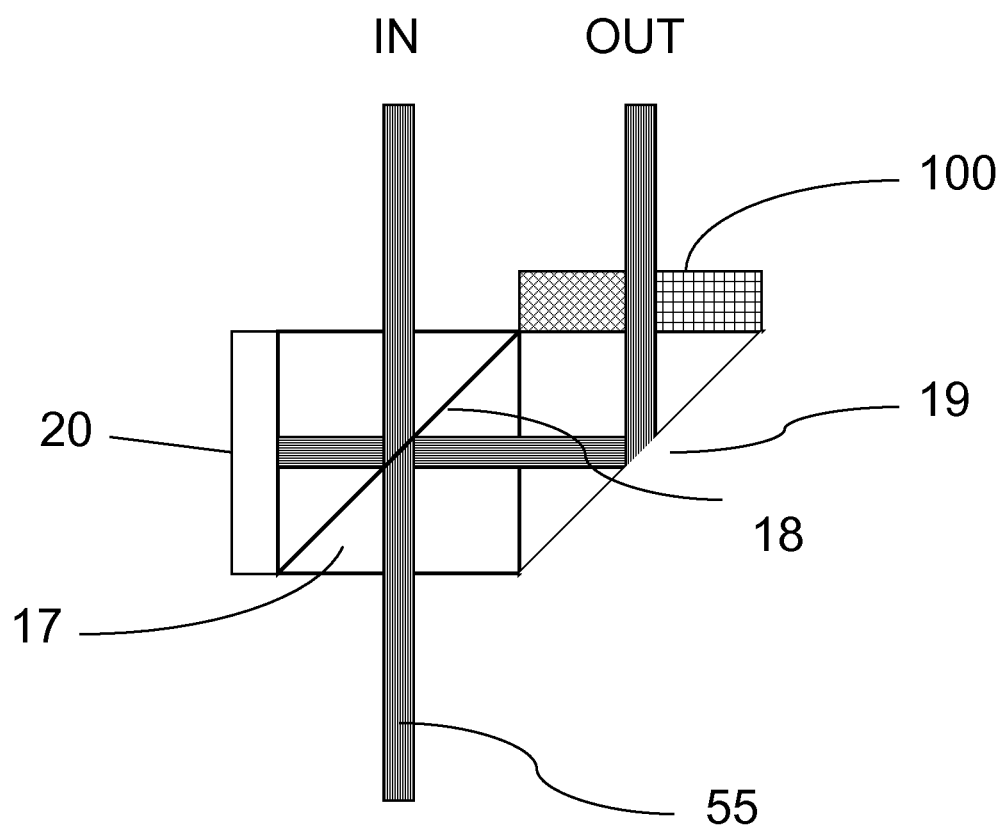

FIG. 5 illustrates a beam distributor 19, comprising beam splitters 17, which is placed in the optical path 55 of the probe beam for in-coupling (IN) and directing the probe beam towards the sensing stylus tip and out-coupling (OUT) and directing the returned beam towards the detector, upon spatial separation of the probe beam from the returned beam, the latter to be analyzed by an optically encoding component like a segmented chromatic filter 100 as illustrated in FIG. 2a and FIG. 3.

Figure 6A:
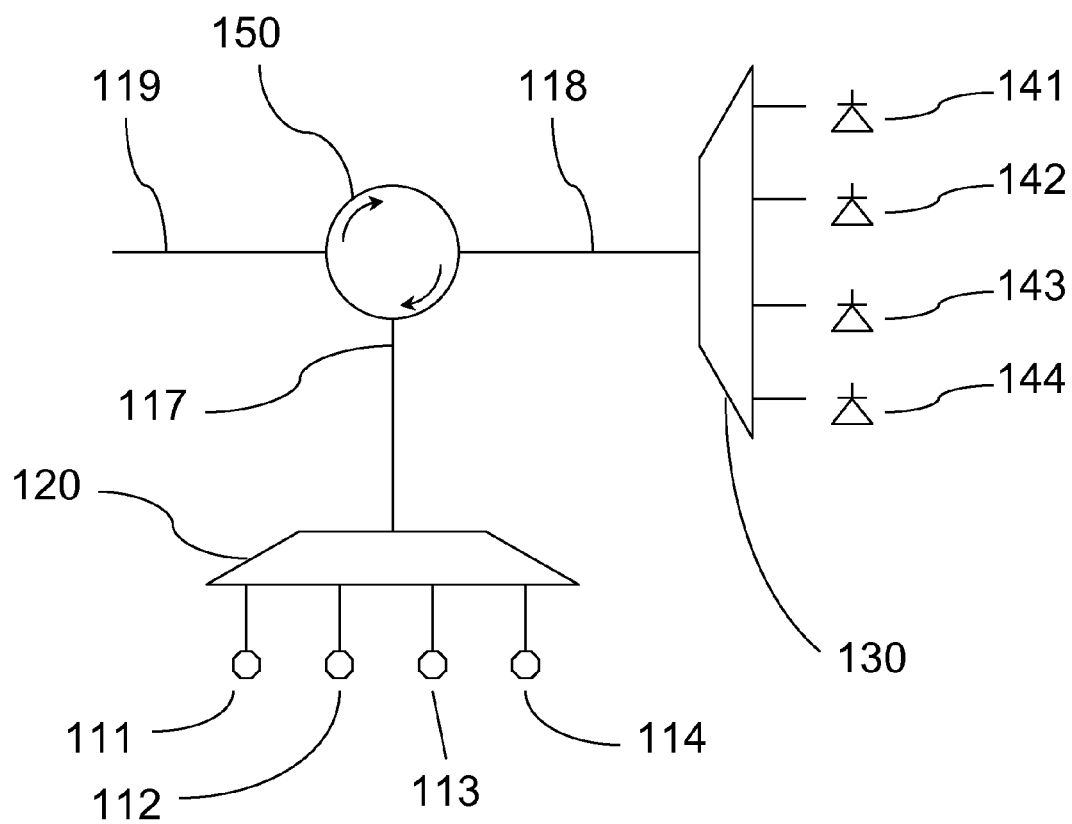

FIG. 6a shows schematically a possible configuration for combining the emission from different light sources using a multiplexer 120 and for spectrally separating with a de-multiplexer 130 a combined signal into spectral fractions for their individual detection.

Figure 6B:
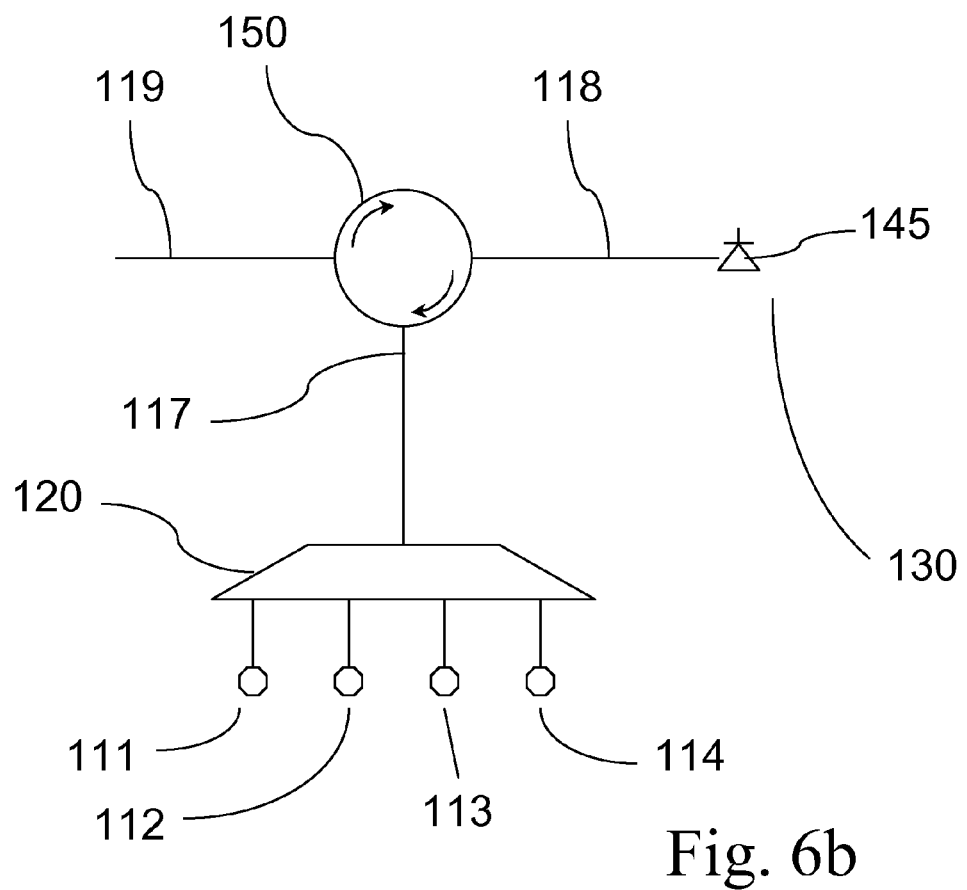

FIG. 6b shows a variation of the configuration according to FIG. 6a using lasers 111 to 114 modulated at different frequencies and only a single detector 145 in combination with Fourier analysis of the detected electrical signal.

Figure 6C:
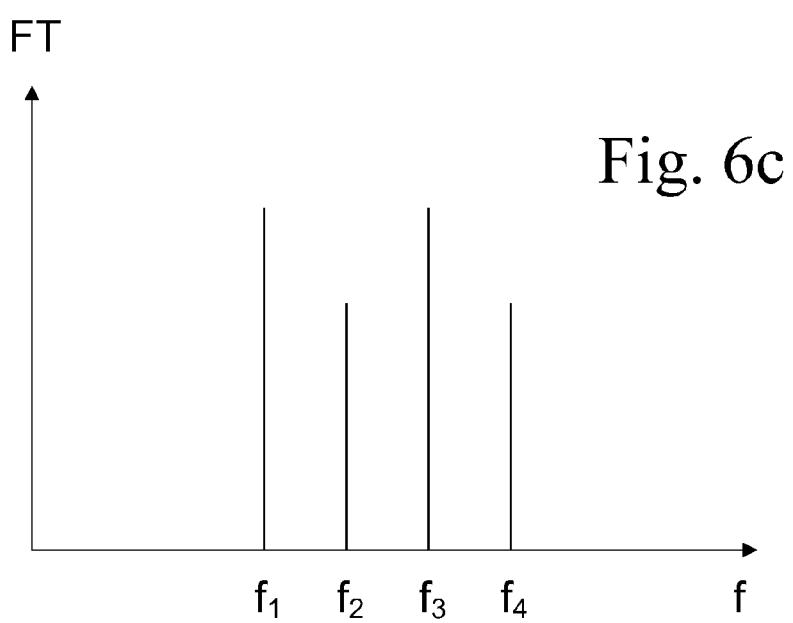

FIG. 6c shows the Fourier spectrum of the lasers 111 to 114 according to FIG. 6b.

Figure 7A:
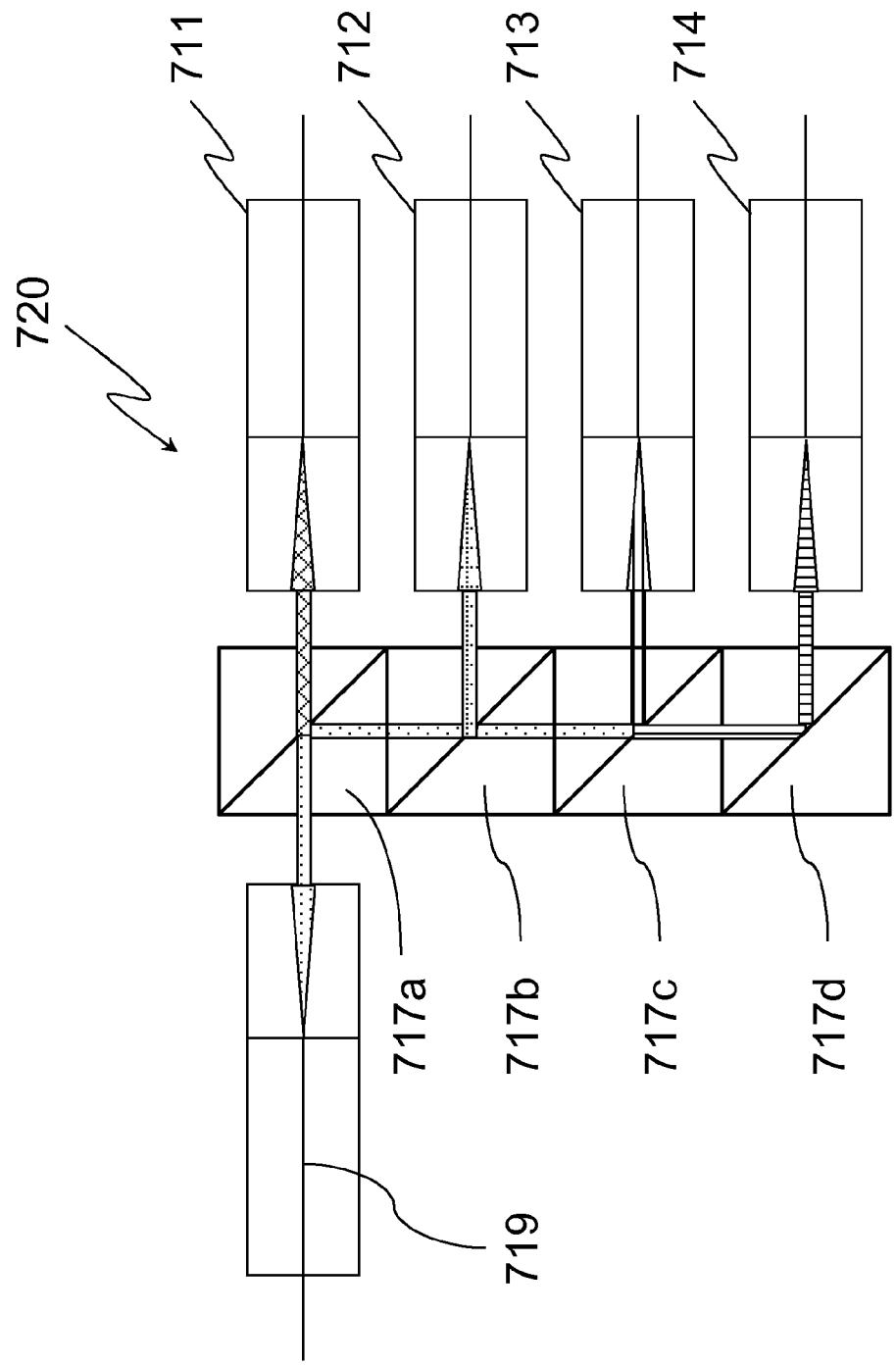
Figure 7B:
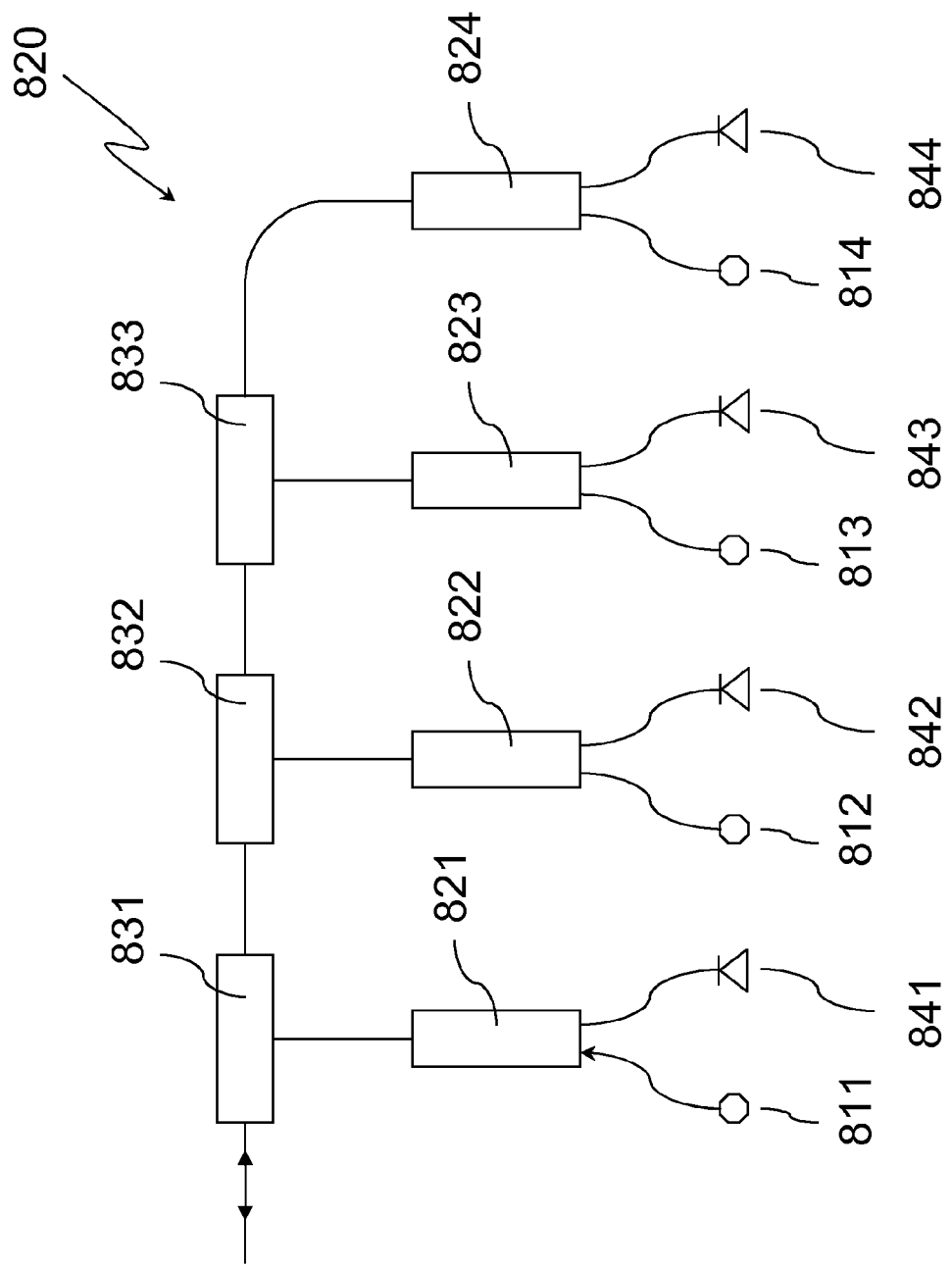

In FIG. 7a and FIG. 7b are illustrated possible embodiments of a multiplexer (720, 820) or a de-multiplexer that can be used in combination with a configuration according to FIG. 6a.

Figure 7C:
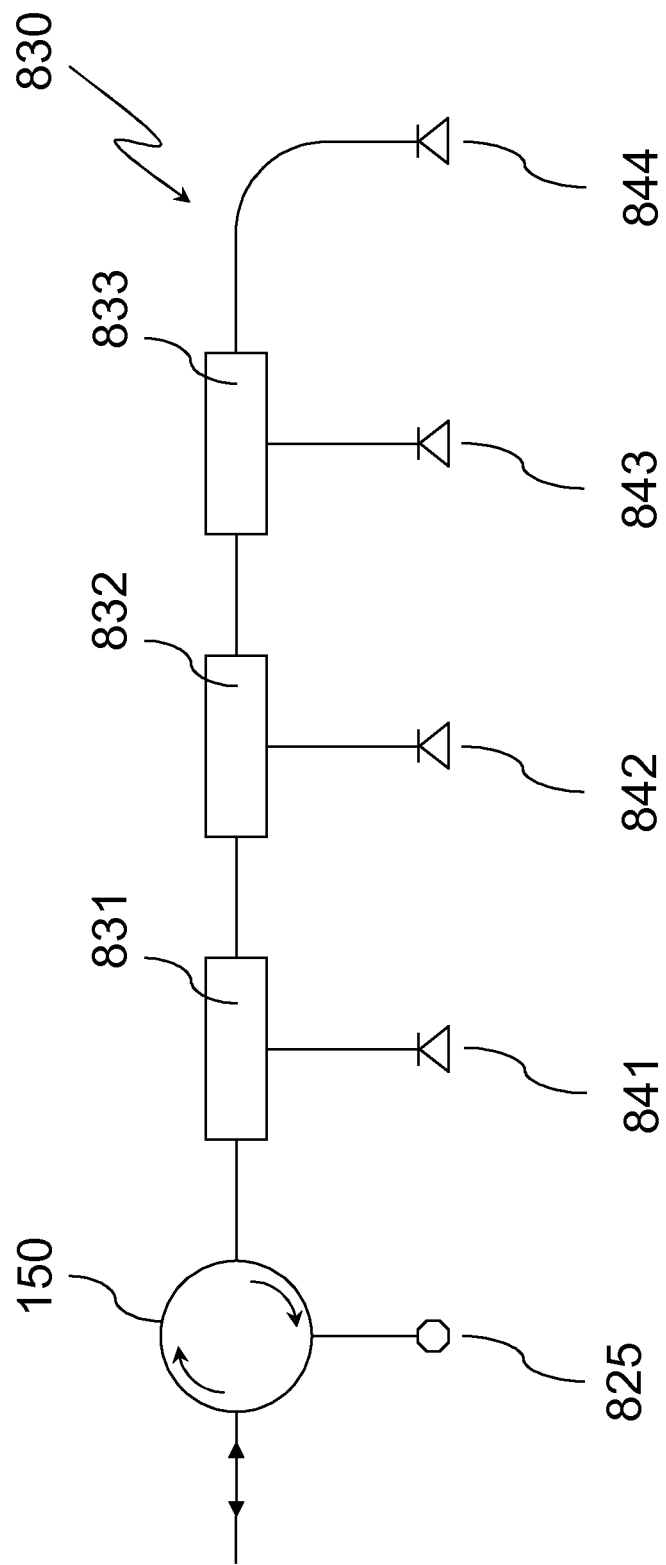

FIG. 7c shows a configuration of a de-multiplexer 830 similar to the one depicted in FIG. 7b, but with a single super-luminescent light emitting diode 825 used as a light source instead of four DFB lasers.

Figure 8:
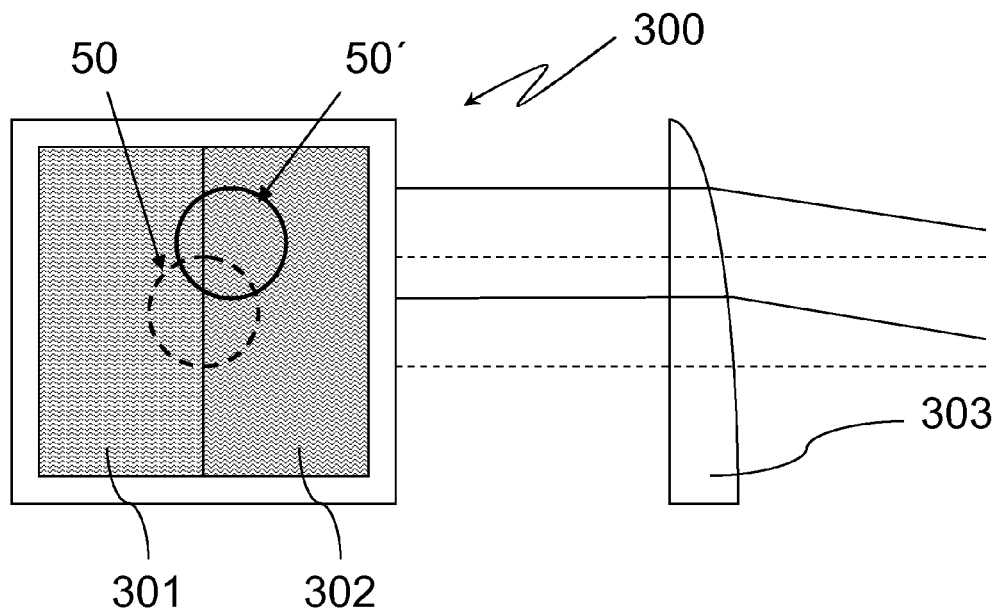

In FIG. 8 is illustrated a further possible embodiment of a segmented optical filter 300 comprising two different chromatic filter segments and a component or functionality to generate a locally in the filter plane varying deflection of the returned beam in a direction perpendicular to its direction of propagation.

Figure 9:
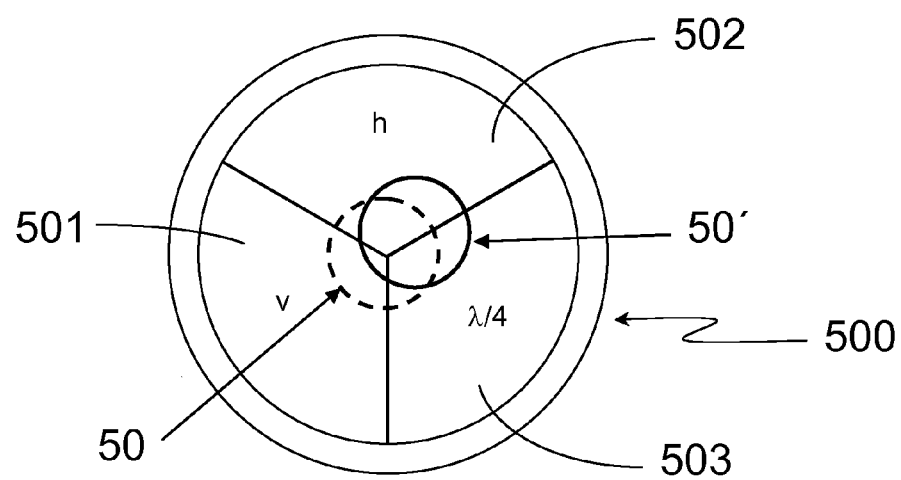

In FIG. 9 is depicted a segmented polarization filter 500 as another possible embodiment of an optically encoding component.

Figure 10:
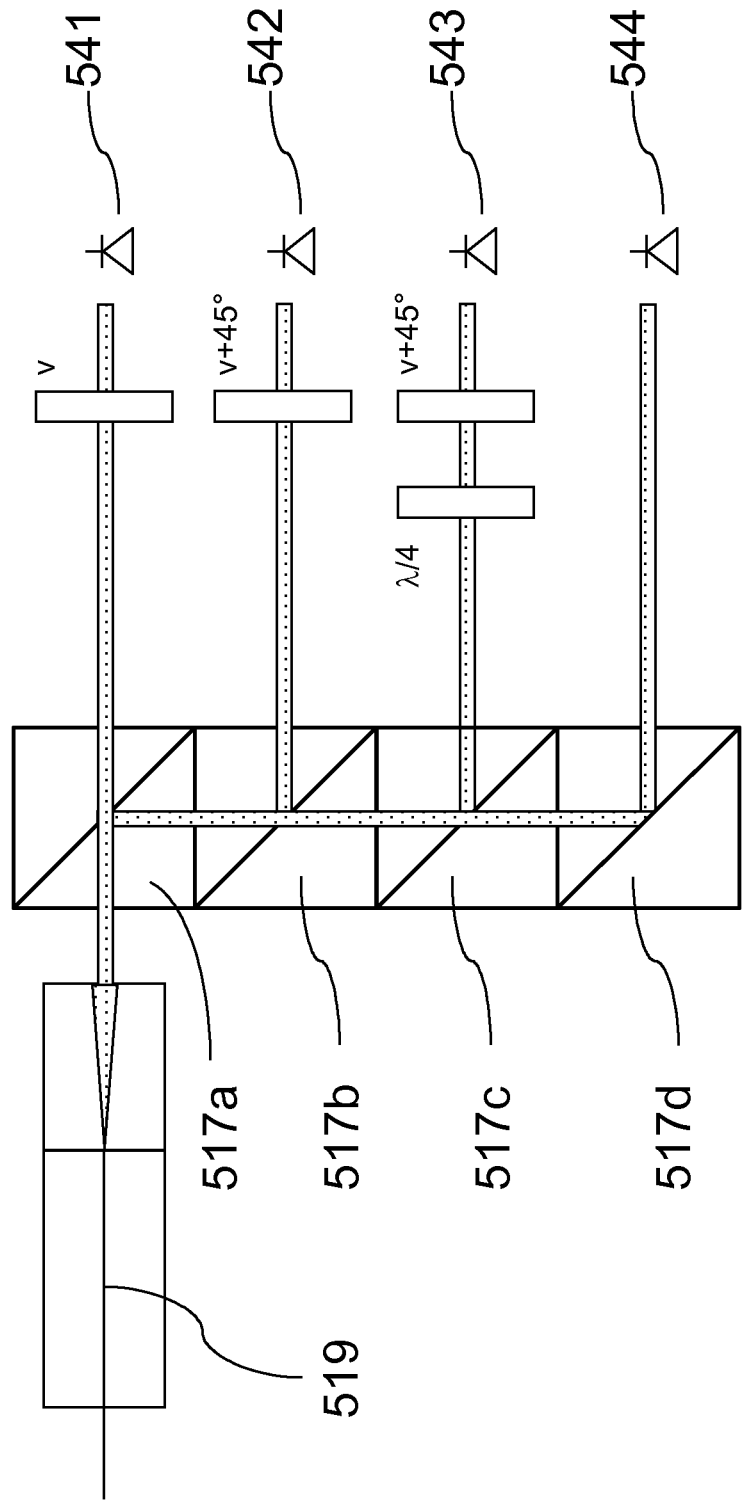

In FIG. 10 is illustrated a possible embodiment of a de-multiplexer having the functionality of a polarimeter setup for determining the polarization state of the returned beam.

Figure 11:
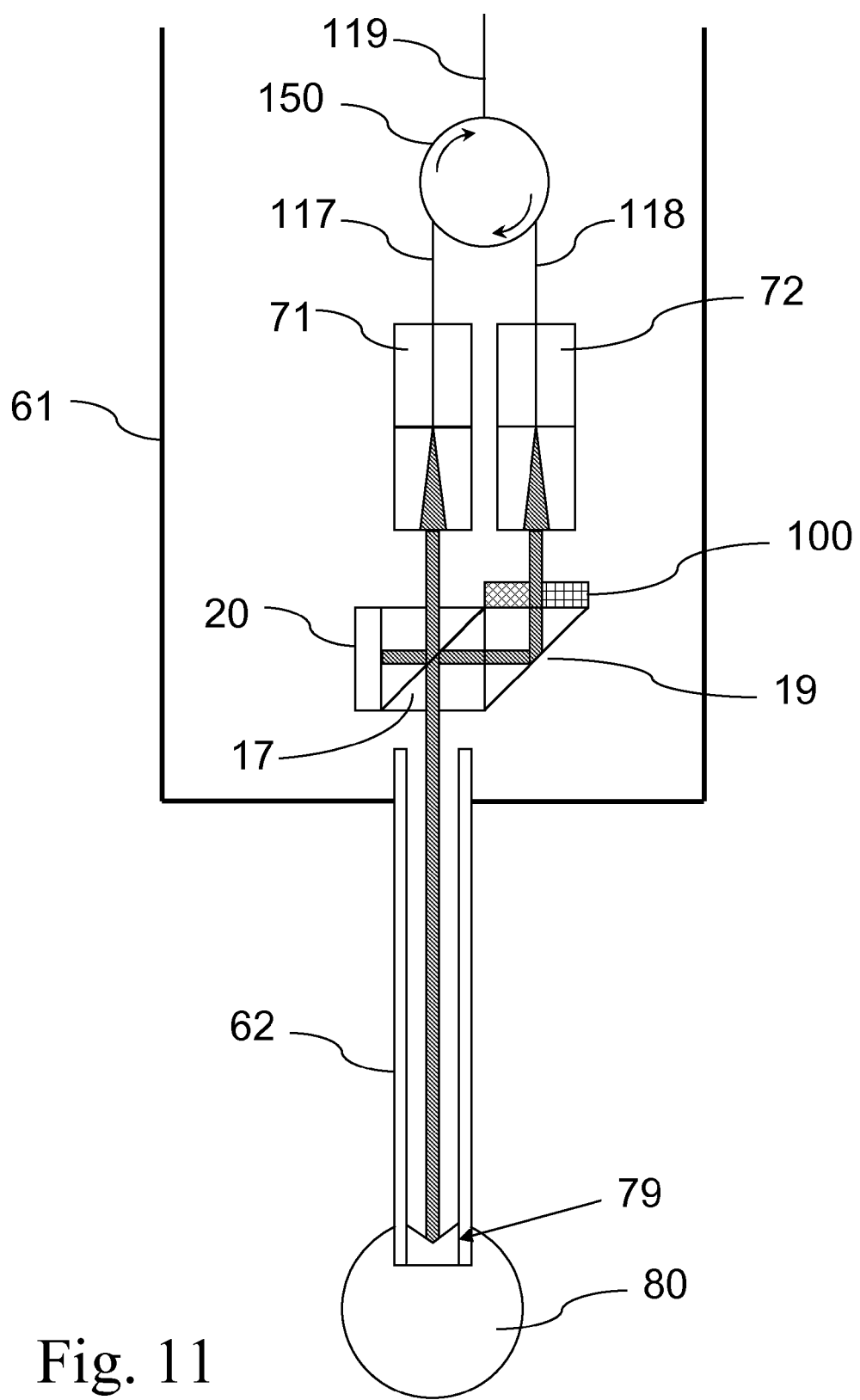

In FIG. 11 is depicted an assembly comprising a stylus carrier 61, a stylus 62 and an optical monitoring system for a measurement configuration using a segmented chromatic filter as shown in FIG. 2a and a beam distributor as shown in FIG. 5, for use in combination with a tactile sensor.

Figure 12:
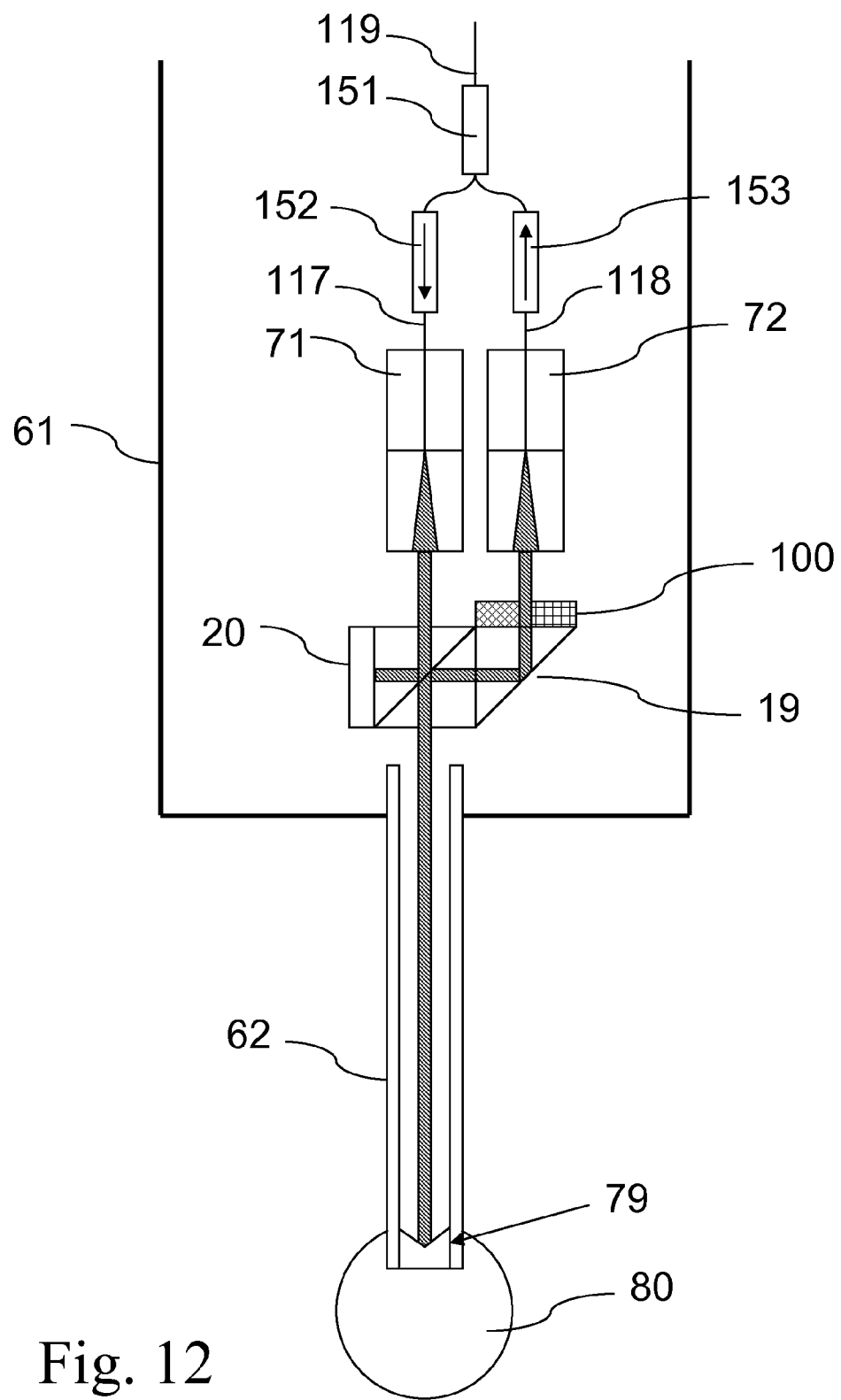

FIG. 12 shows a configuration similar to the one depicted in FIG. 11 except for replacement of the circulator 150 by a fusion coupler 151 and two insulators 152, 153.

Figure 13:
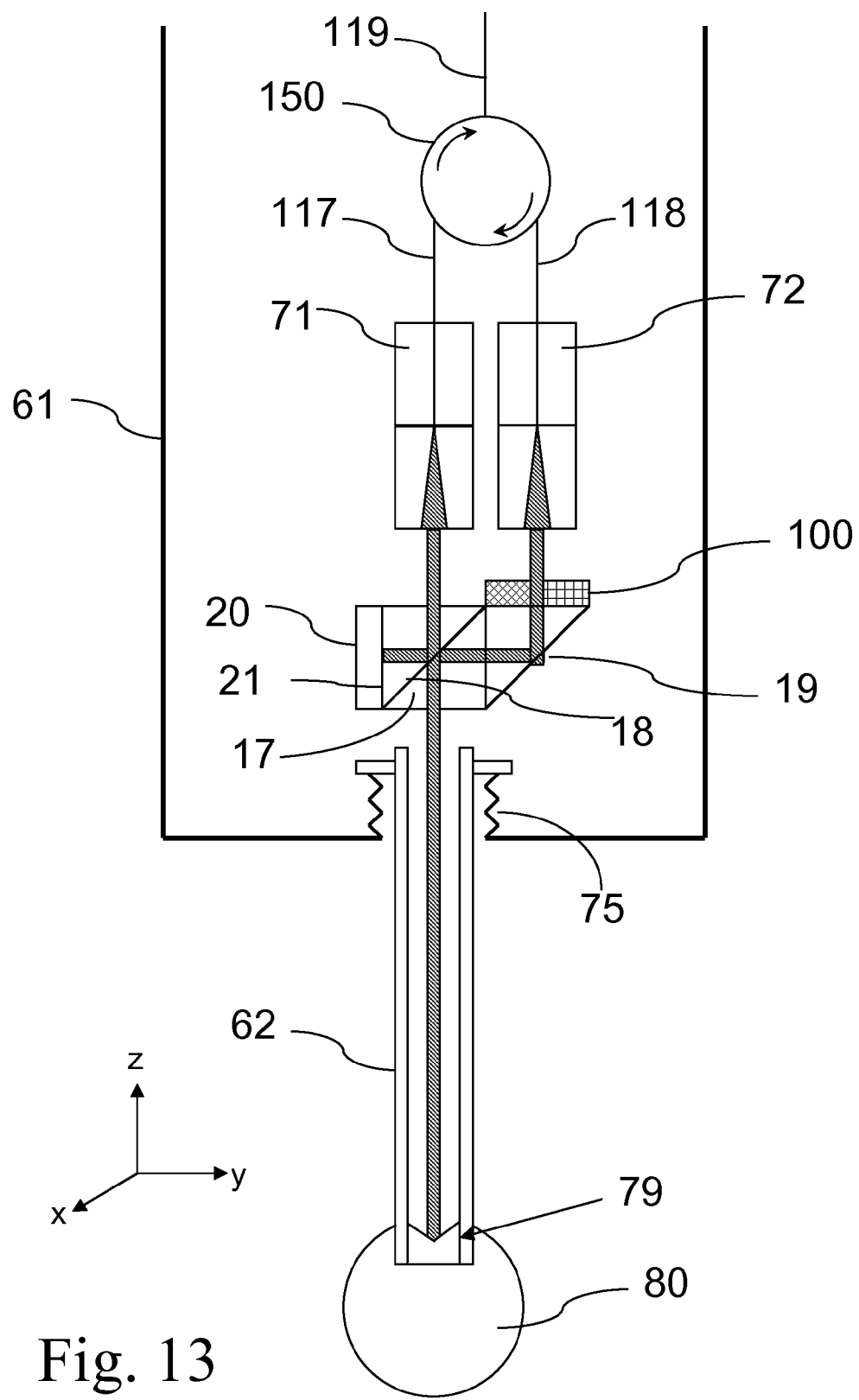

In FIG. 13 is illustrated an assembly essentially similar to the one depicted in FIG. 11, comprising a stylus carrier 61, a stylus 62 and an optical monitoring system tailor-made for such a measurement configuration with, in combination, a beam distributor as depicted in FIG. 5, for providing four segments for distinction of spectral light components ($\lambda 1, \lambda 2, \lambda 3, \lambda 4$; measurement of the intensities of the transmitted spectral fractions) and one of the four channels also for the determination of a phase change by an interferometric measurement.

Figure 14:
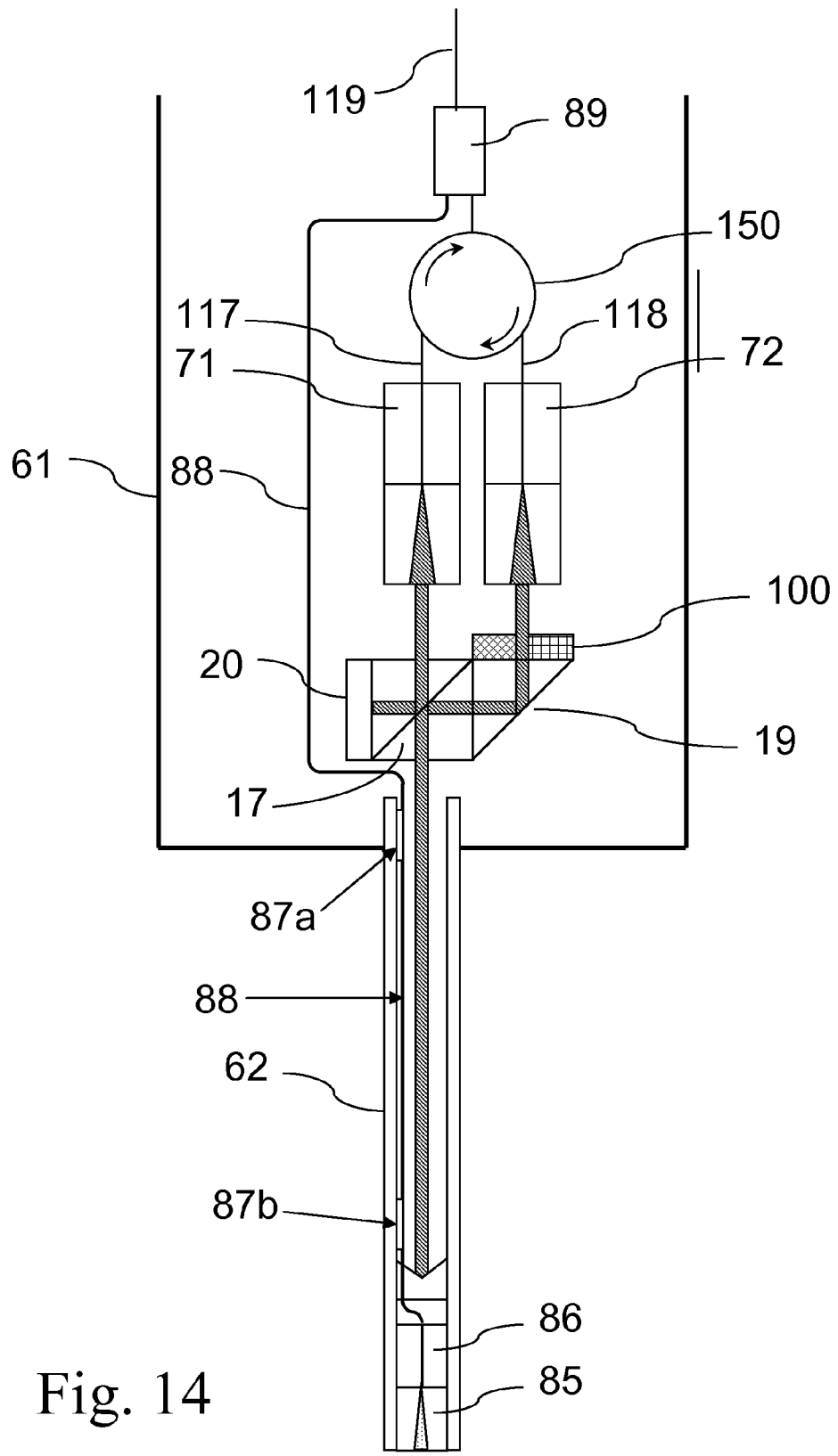

FIG. 14 illustrates a configuration using an optical sensor instead of a tactile sensor for the distance measurement.

Figure 15:
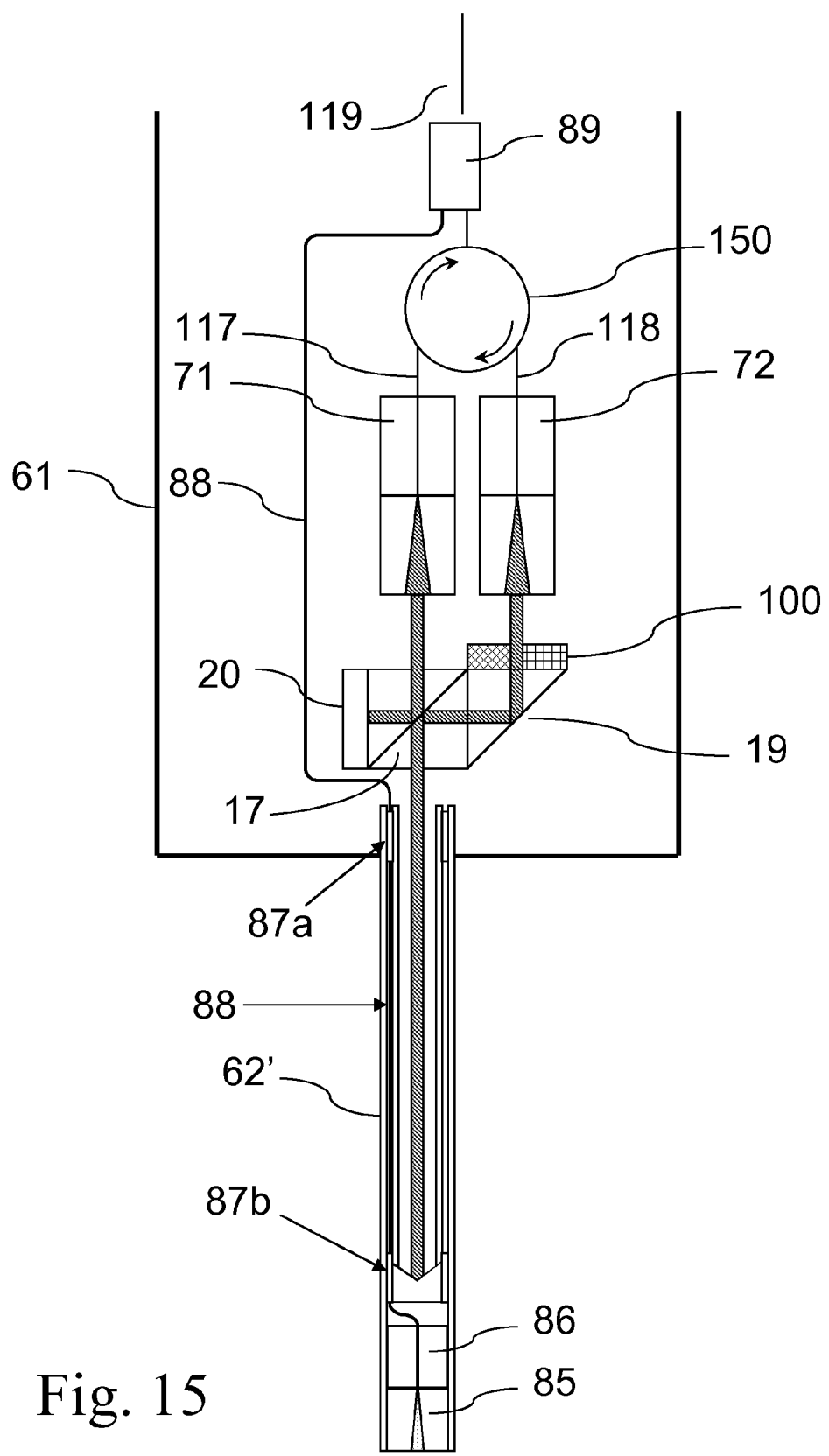

FIG. 15 shows an alternative configuration to the one of FIG. 14, wherein a stylus 62' is provided as a double tubus with a double inner wall for receiving optical fiber 88.

Figure 16:
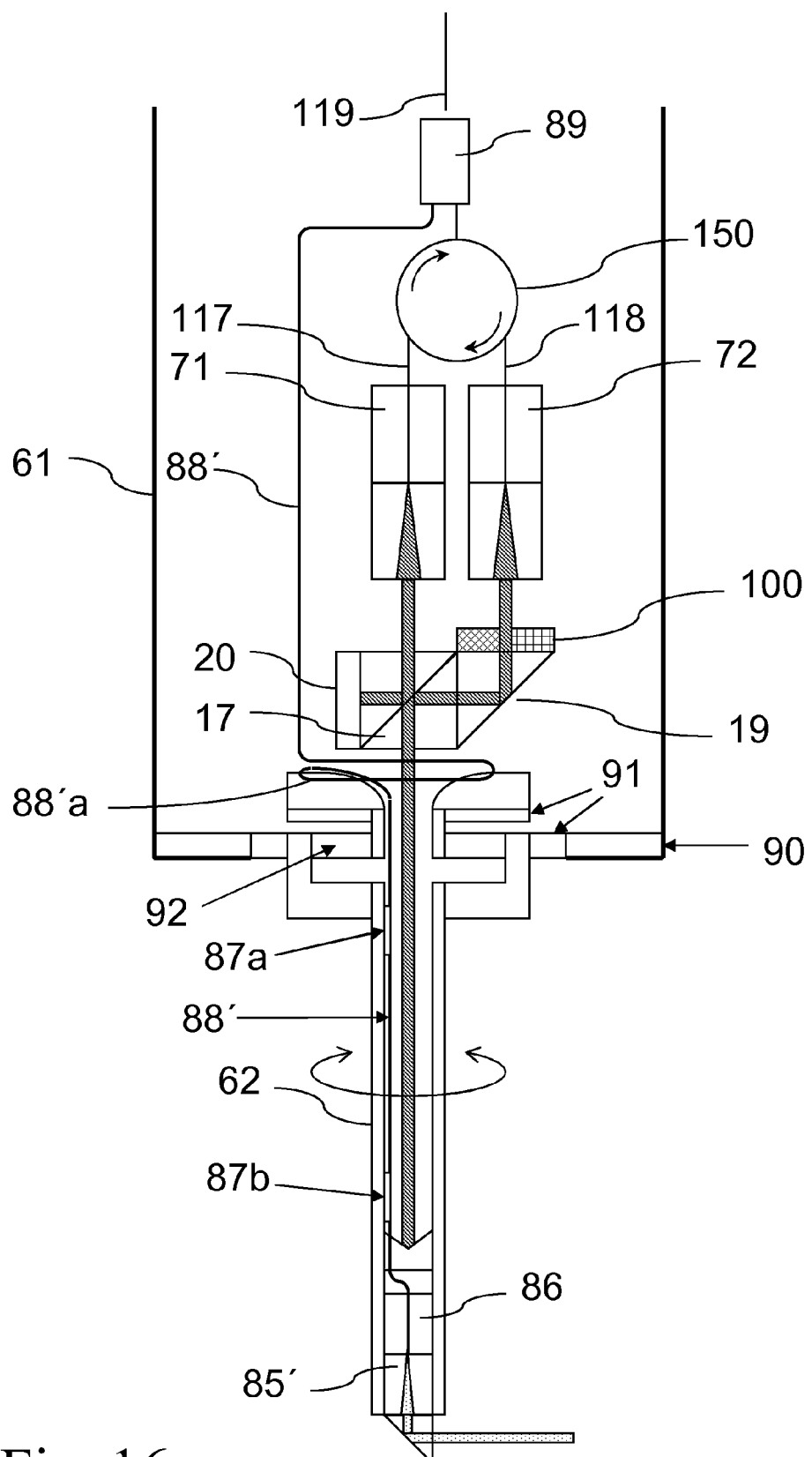

FIG. 16 illustrates a surface sensing device with an optical sensor, the sensing device being provided with a rotary actuator.

Figure 17A:
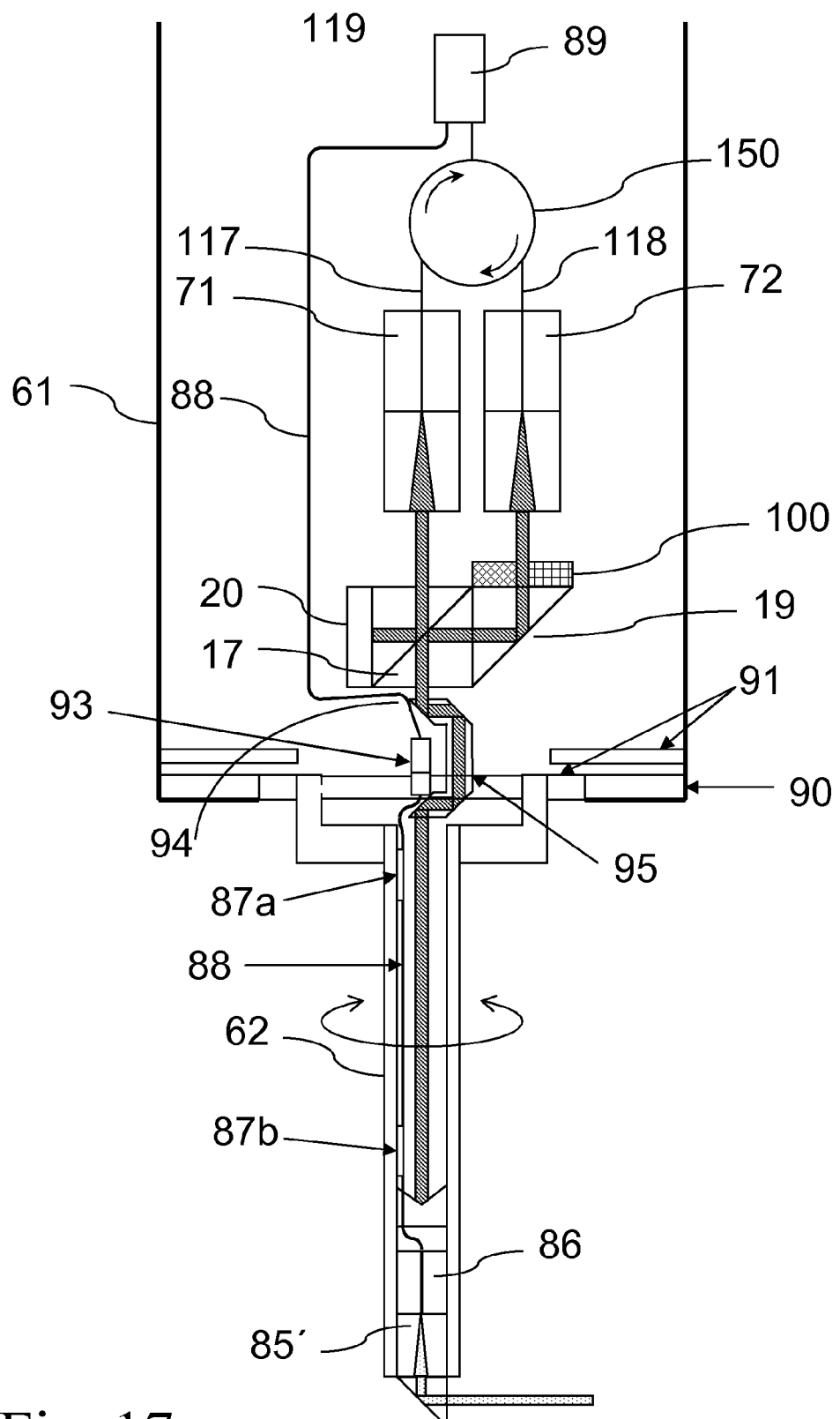

FIG. 17a shows a variation of the configuration according to FIG. 16, designed for allowing unlimited rotation of the stylus.

Figure 17B:
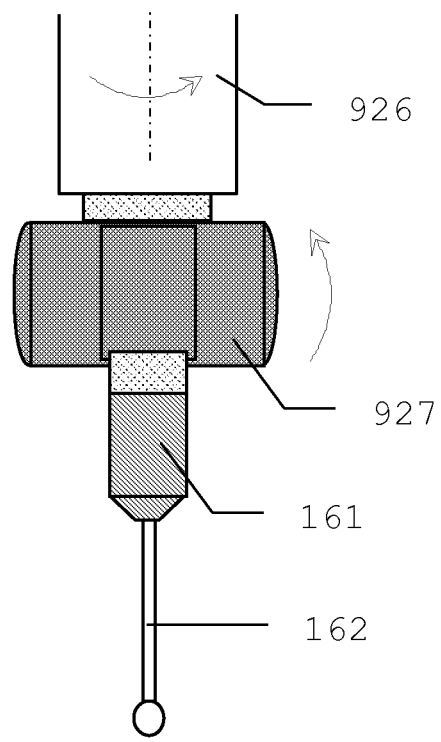

FIG. 17b illustrates an example with two rotation axes providing freedom of rotation of the stylus carrier around two perpendicular axes.

Figure 18:
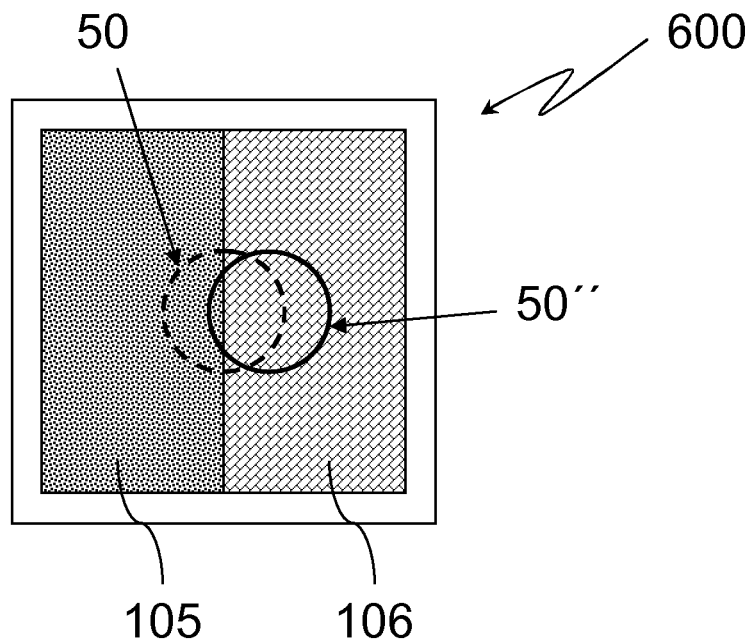

FIG. 18 shows a segmented chromatic filter 600 with two segments dedicated for a combination, e.g., with a segmented chromatic filter as shown in FIG. 2a or FIG. 5 for a surface sensing device provided with 3-axes measurement capability.

Figure 19:
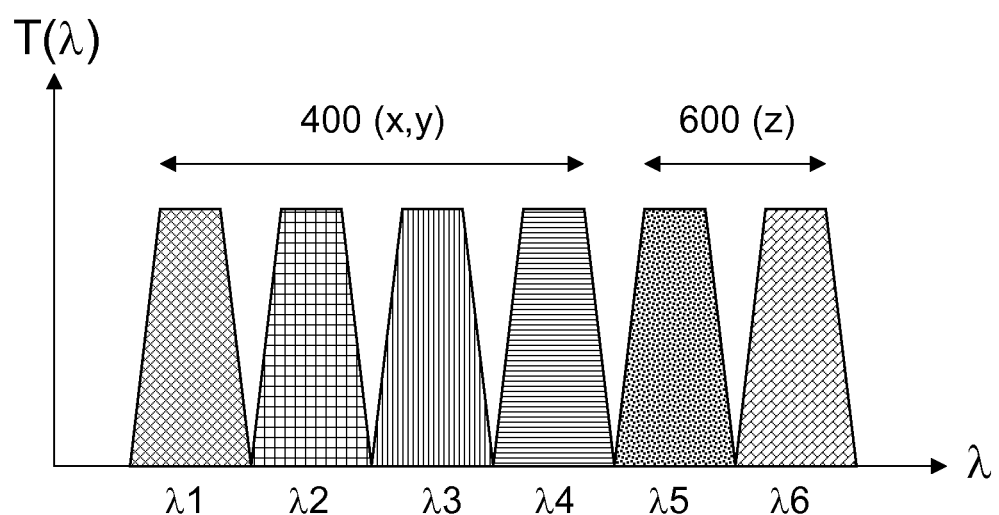

FIG. 19 illustrates spectral transmission ranges around $\lambda 1$ to $\lambda 4$ covered by segments of segmented chromatic filter 100(X,Y), adjacent to spectral range (λ5, λ6) covered by the two segments of 2-segments filter 600(Z) of FIG. 18.

Figure 20:
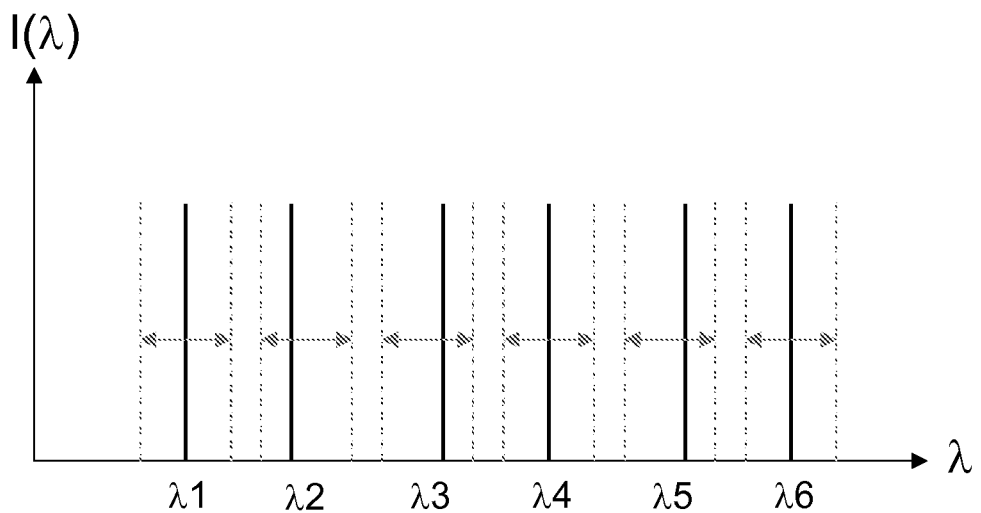

FIG. 20 illustrates the choice of six individual laser light sources with emission lines in the spectral range of the combined filters of FIG. 19.

Figure 21:
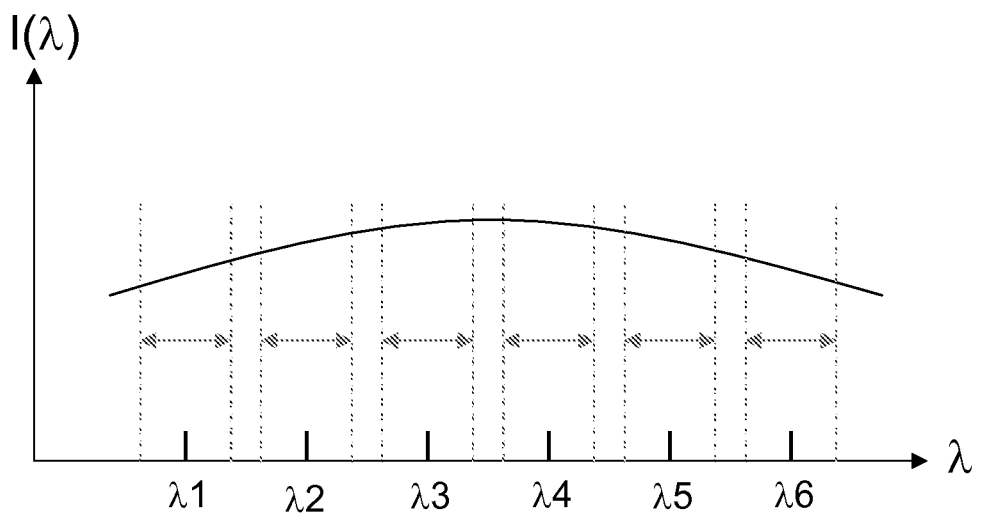

FIG. 21 shows a typical spectral distribution of the light emitted by a super-luminescent light-emitting diode (SLED), with a bandwidth of typically about 10 nm, as alternatively a single light source, the spectral emission band spanning the transmission windows of all six filter segments.

Figure 22:
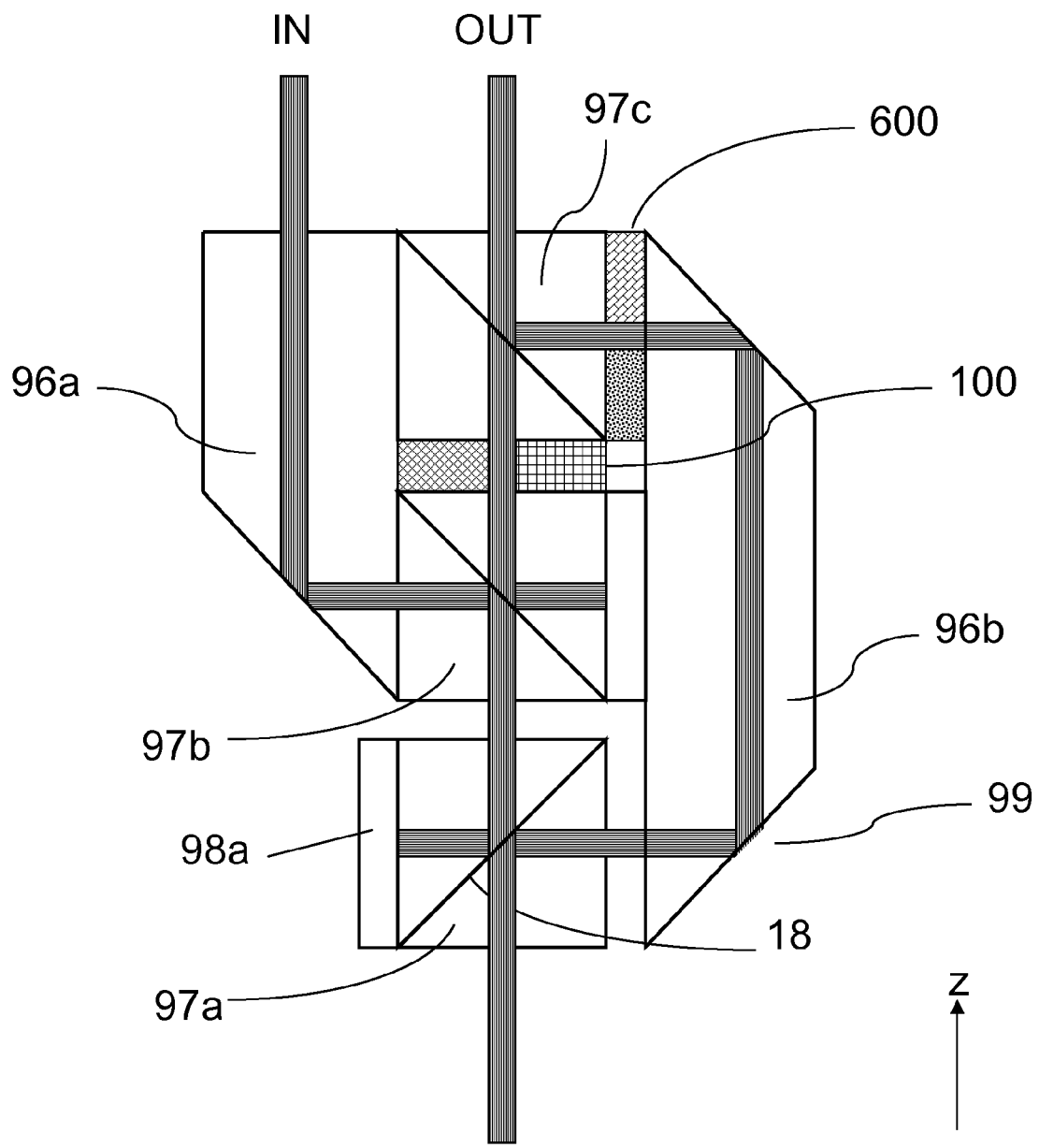

FIG. 22 illustrates a possible configuration of a beam distributor 99 with beam splitters for use with a combination of segmented chromatic filters 100 and 600.

Figure 23:
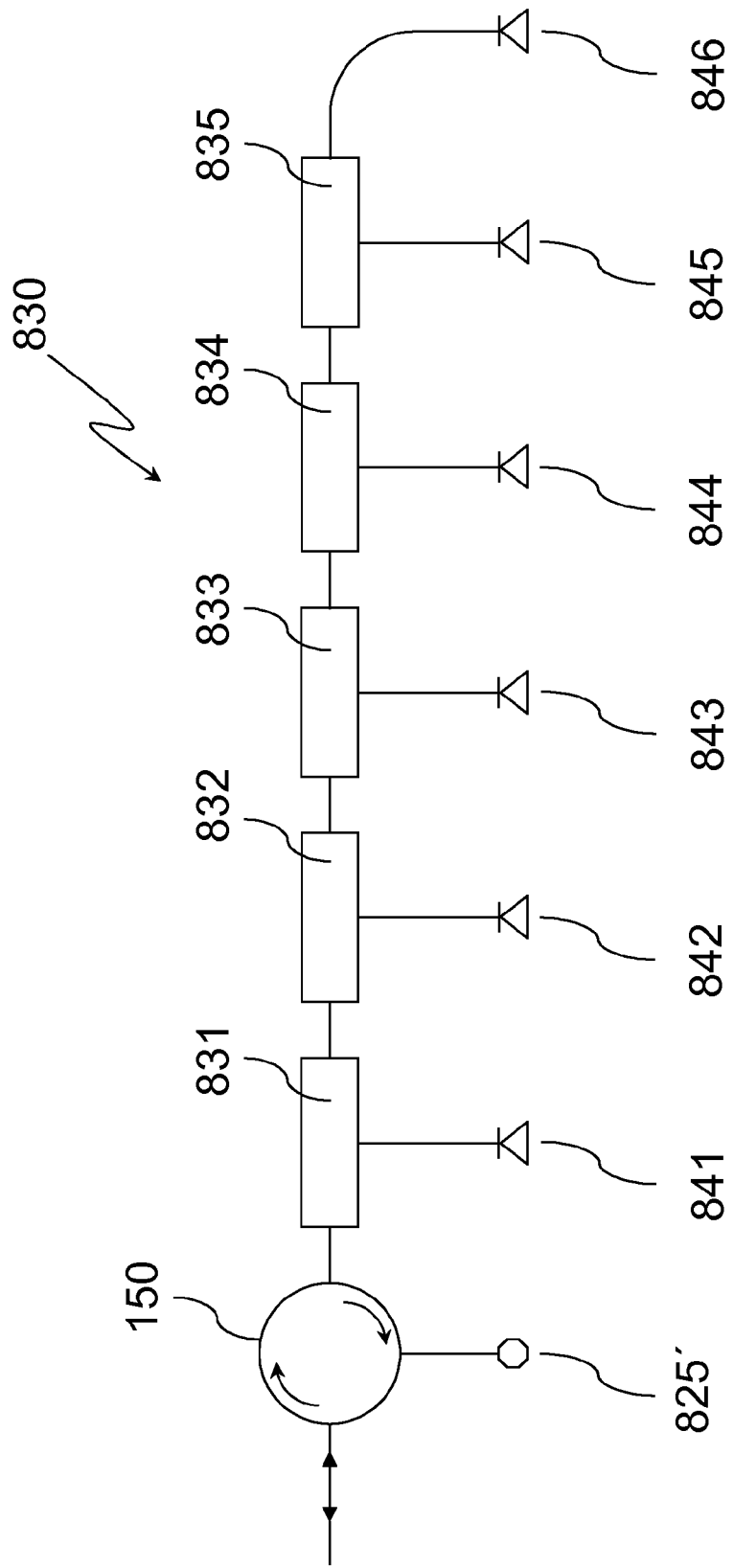

FIG. 23 illustrates a de-multiplexing configuration for use in combination with a super-luminescent light-emitting diode 825', as shown in FIG. 7c, but now accomplished by two further spectral separation channels.

Figure 24:
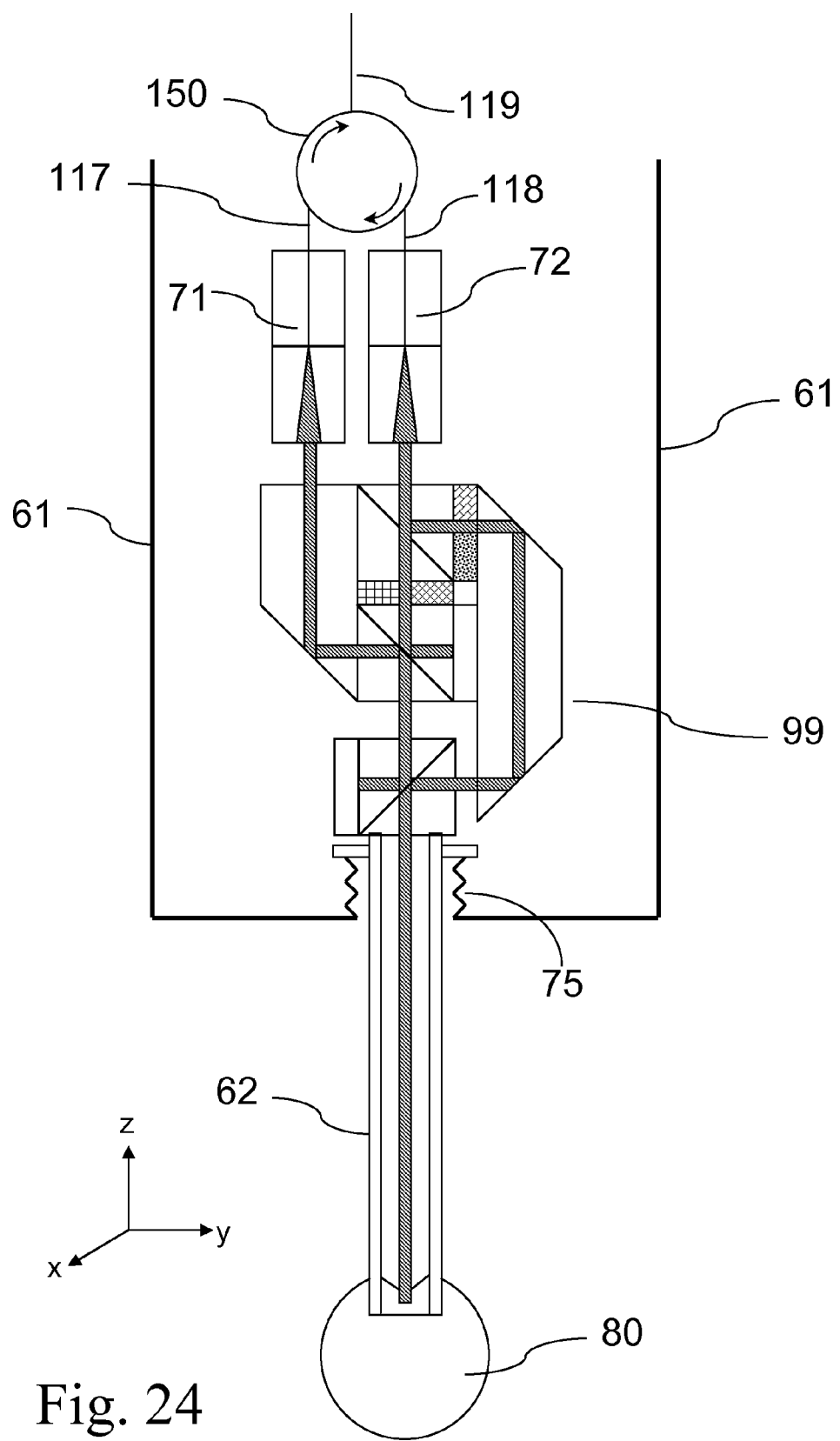

In FIG. 24 is depicted an assembly comprising a stylus carrier 61, a stylus 62 and an optical monitoring system designed for optical measurement with respect to X, Y and Z direction.

Figure 25:
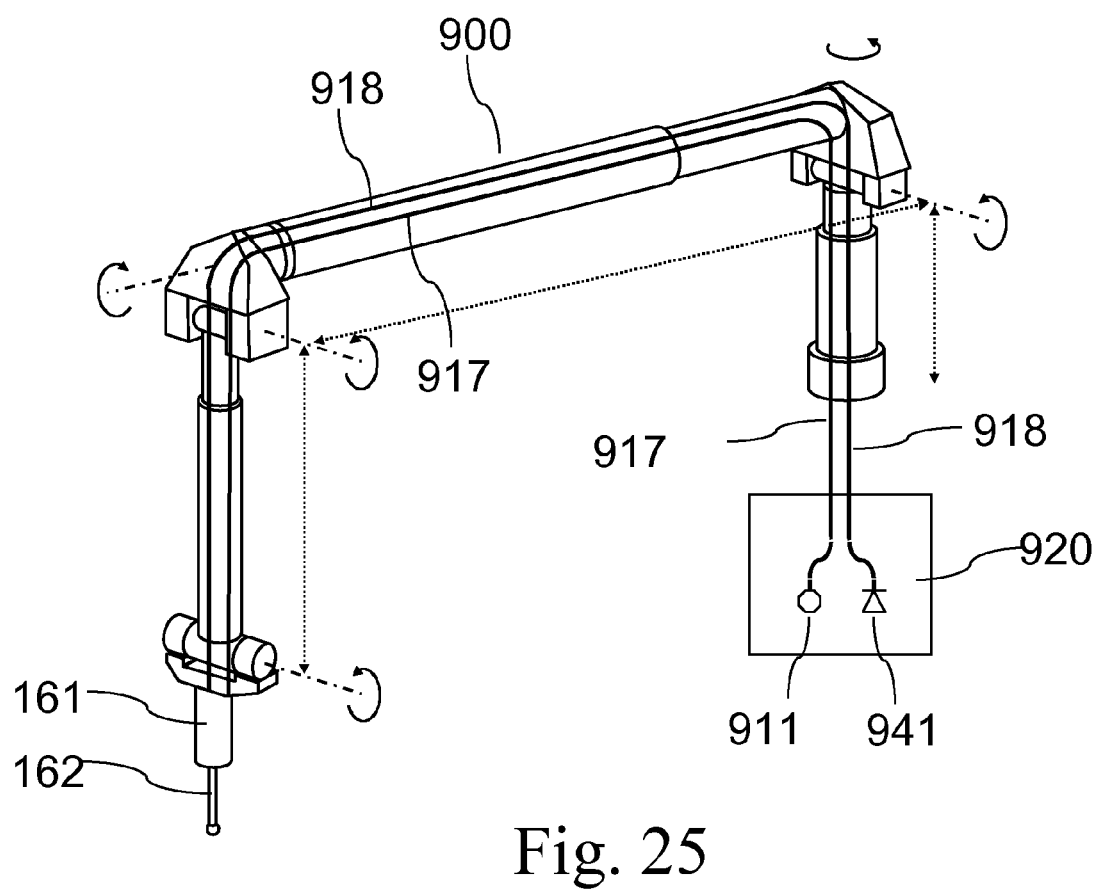

FIG. 25 illustrates an articulated arm coordinate measuring machine (CMM) 900 equipped with a stylus 162 attached to a stylus carrier 161.

Figure 26:
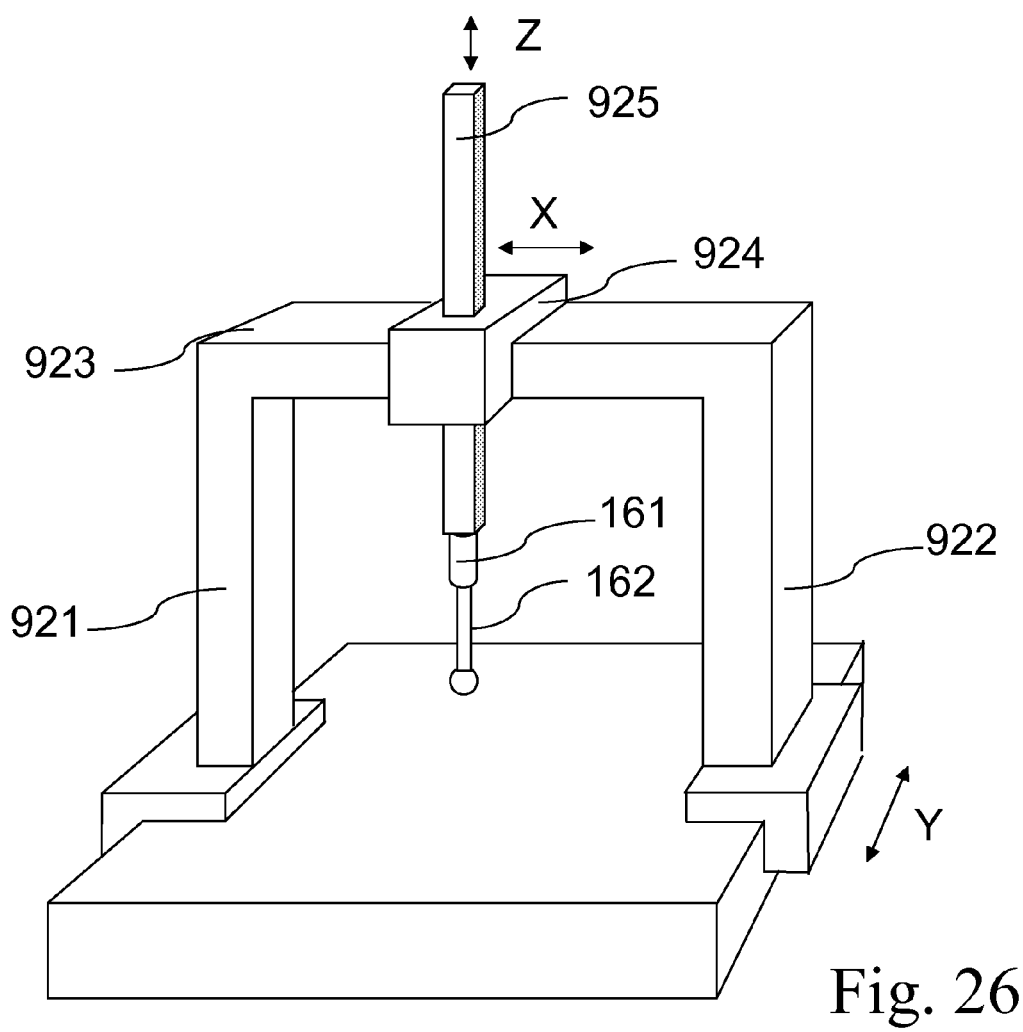

In FIG. 26, as another example, a bridge-type CMM is shown.

FIGS. 27a-27d show the measured intensity distribution of the light components of the downward shifted returned beam, after passing a segmented chromatic filter as described with reference to FIG. 2a.

FIG. 28 illustrates in its upper part the mode of the optical fiber, in a cross-sectional view. The two lower parts of FIG. 26 show intensity profiles in X and Y direction for one of the four free propagating partial beams.

FIGS. 29a-29d show photos of the intensity distribution of the four partial beams (see FIG. 27a to FIG. 27d) in the optical fiber plane.

Figure 30:
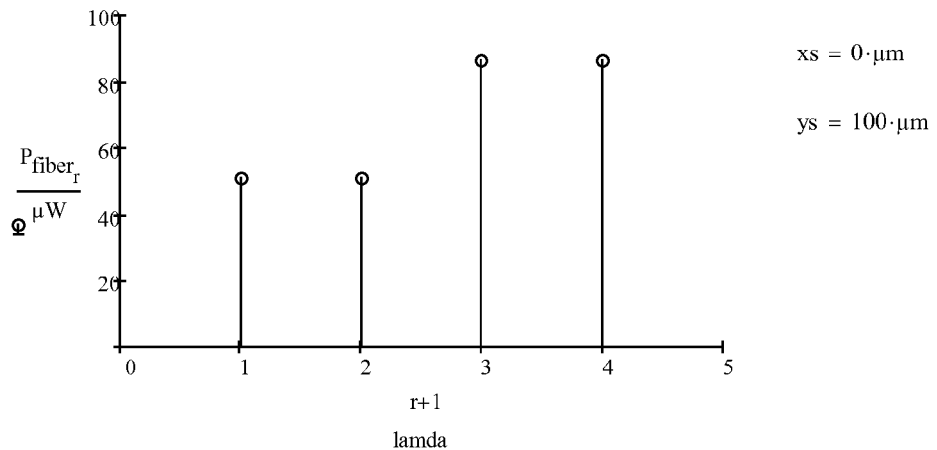

FIG. 30 displays the spectral intensity distribution of the returned beam into the four optical channels for the example of a beam displacement by 100 μm.

Figure 31:
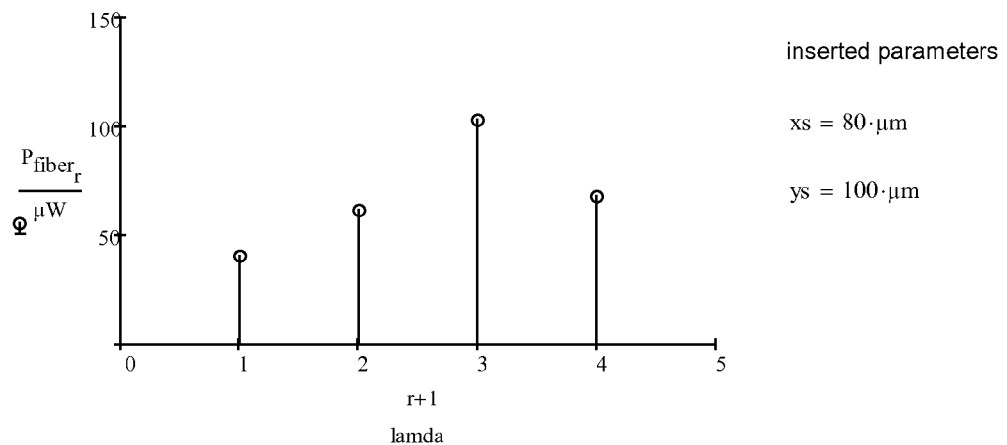

FIG. 31 shows the spectral intensity distribution of the returned beam into the four optical channels for the example of a beam displacement in oblique direction.

DETAILED DESCRIPTION OF THE FIGURES

In the following, the invention is described with reference to the figures. If not stated otherwise, all embodiments (including those described already above) can be combined.

In the following, equal reference numbers indicate equal system components or components used for equivalent functionality; X, Y and Z directions are understood in a same way throughout the description, corresponding to a horizontal plane (X, Y) and a vertical direction (Z).

Figure 1:
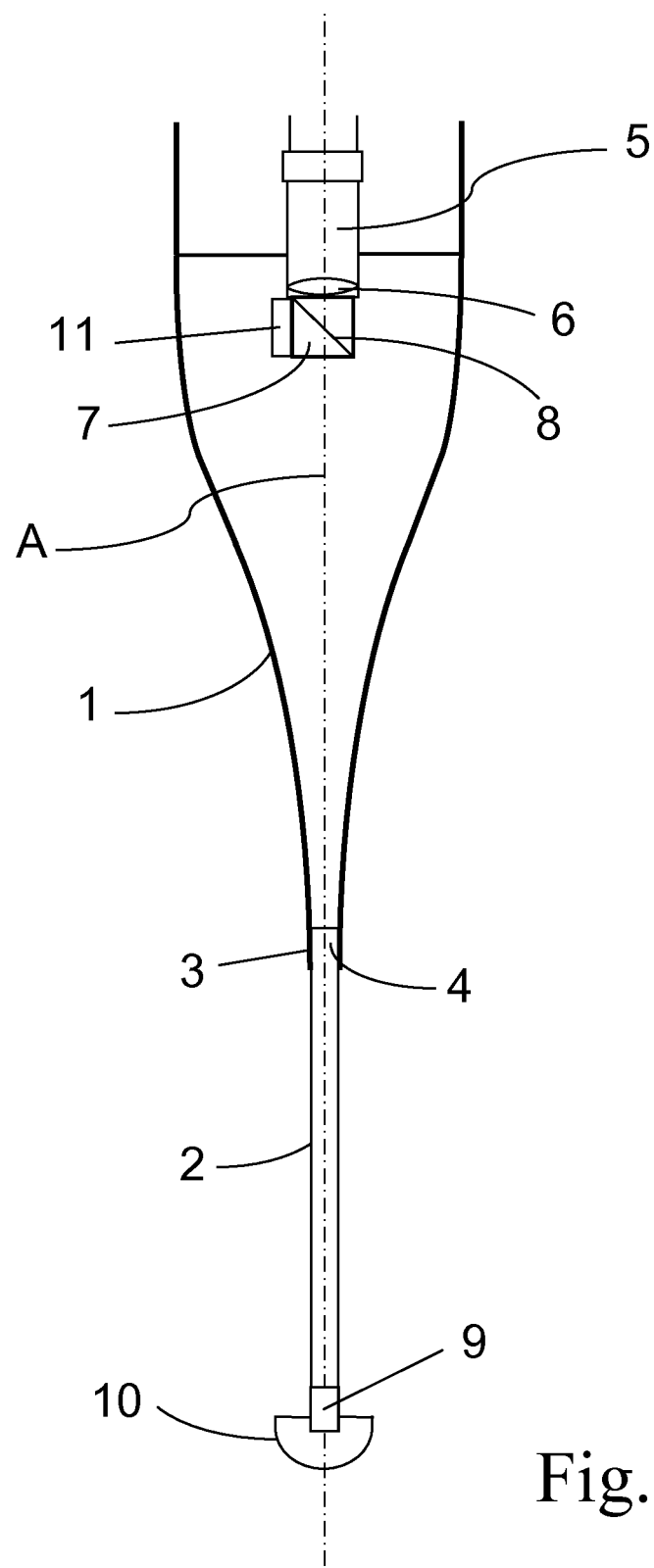

FIG. 1 shows an assembly of a stylus carrier 1 and a hollow stylus 2 dedicated for use in combination with a tactile sensing probe provided with an object-contacting tip 10, according to the state-of-the-art (U.S. Pat. No. 6,633,051). The stylus carrier 1 has a trumpet-like shape. The stylus 2 is connected with the stylus carrier 1 by connection means 3 at the upper, open end 4 of the stylus, the longitudinal axis of the stylus 2 being aligned with the axis A of the stylus carrier 1.

In the stylus carrier is mounted an optical monitoring system comprising a laser light source 5 at the output end of which is placed a convex lens 6 for generating a collimated laser beam which is propagated, after passing a beam splitter 7, as a free optical beam within the hollow stylus 2 towards a retro-reflector 9 provided close to the contacting tip 10. Light returned by the retro-reflector 9 hits a reflecting surface 8 of the beam splitter 7 under an angle of 45° with respect to the optical axis and the axis A and is reflected at right angles to the axis A towards a position-sensitive detector 11. Any displacements of the contacting tip 10 together with the retro-reflector 9 lead to a lateral displacement of the returned beam in the plane of the detector 11.

As a major disadvantage of this configuration, as already outlined above, the optical monitoring system including laser light source 5, detector 11 and driver electronics is mounted in the stylus carrier 1, thus enclosing several heat sources in the closed frame formed by the stylus and its carrier and leading to uncontrollable deformations of the measurement system as long as thermal equilibrium is not reached.

In FIG. 2a is illustrated a segmented chromatic filter 100 as an example for an optically encoding component. In this example, the filter comprises four segments 101-104 corresponding to filters with maximum transmission at four different wavelengths λ1, λ2, λ3 and λ4, with preferably spectrally non-overlapping transmission ranges, as schematically shown in FIG. 3 (transmission T(λ)). The filter transmissions may, for example, be adapted to the radiation channels according to the ITU norm for telecommunication, with a spectral separation of, e.g., 100 GHz or 200 GHz, corresponding to about 0.8 nm or 1.6 nm in the C and L-band.

The filter may have any geometry, like circular, square-type or polygonal. For purposes of easiness of adjustment in an optical beam path and of system calibration, a point-symmetric shape is preferred.

The segmented filter is positioned, in an exemplified, ideal case, in the optical path of the returned beam in such a way that in absence of a displacement of said returned beam (because of a displacement of the stylus tip or bending of the stylus), the cross-section 50 of the returned beam in the filter plane is centrally symmetric with respect to the segmented filter/filter segmentation. In a further idealization, the transmission characteristics of the filter and the spectral composition of the probe beam and consequently also of the returned beam are selected (the latter e.g. by using laser light sources of selected emission wavelengths) in such a way that the transmitted fractions of returned light, after passing the segmented filter, are equal (equal distribution of the transmitted light fractions).

When the returned beam is displaced because of a displacement of the stylus tip or a bending of the stylus, its cross-section 50' in the filter plane will no longer be symmetric with respect to the segmented filter/filter segmentation. As a consequence, the transmitted fractions of the light components after passing the filter will deviate from equal distribution.

Figure 2B:
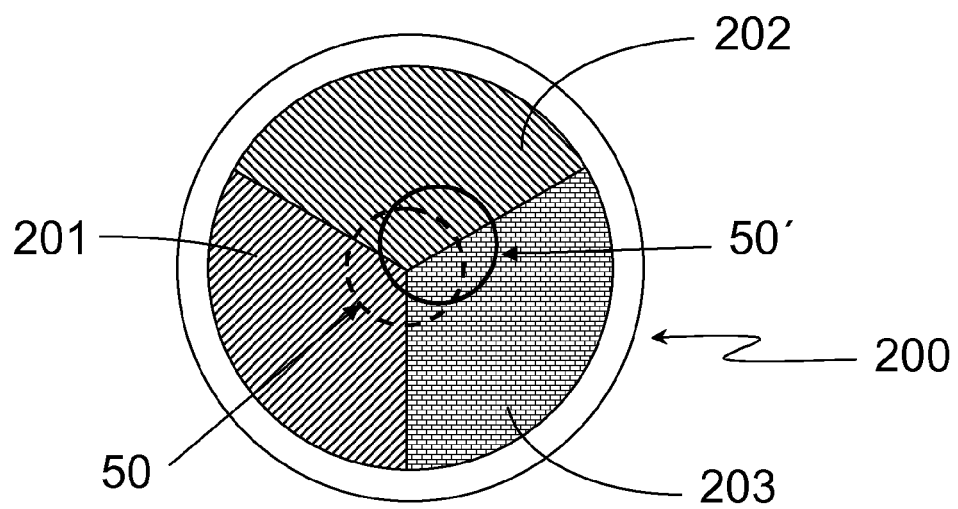

FIG. 2b shows an alternative embodiment of a segmented chromatic filter as a second example for an optically decoding element. In this case, the segmented chromatic filter 200 comprises three segments 201, 202 and 203 corresponding to individual filters with maximum transmission at wavelengths λ1, λ2 and λ3, respectively. Concerning convenience of manufacturing, however, a segmented filter with four segments as shown in FIG. 2a is probably preferable.

FIG. 4a and FIG. 4b illustrate the selection of laser light sources, their emission wavelength being correlated with the selection of a segmented chromatic filter to be used in combination therewith. FIG. 4a indicates the emission lines (intensities I(λ)) of four selected individual lasers. The emission wavelengths may vary within the intervals indicated by arrows. A special stabilization of the laser wavelength is not necessary, in contrast to applications in telecommunications, the laser signal being only weakly modulated (in the MHz range) for more stable AC detectability.

FIG. 4b shows a typical spectral distribution of the light (intensity I(λ)) emitted by a super-luminescent light-emitting diode (SLED), with a bandwidth of typically about 10 nm.— The SLED has to be chosen in such a way that its emission spans the transmission windows of the segmented chromatic filter (cf. FIG. 3), where the returned beam of light from the SLED would be separated into spectrally separated fractions.

FIG. 5 illustrates a beam distributor 19, comprising beam splitter 17, which is placed in the optical path 55 of the probe beam for in-coupling (IN) and directing the probe beam towards the stylus tip, and out-coupling (OUT) and directing the returned beam towards the at least one detector, upon spatial separation of the probe beam from the returned beam, the latter to be analyzed by an optically encoding component like a segmented chromatic filter 100 as shown in FIG. 2a.

The returned beam, potentially displaced because of a bending of the stylus or displacement of the stylus tip, is directed to the optically encoding component, in particular a segmented chromatic filter 100, by passing the beam splitter 17 which may be a 50% splitter. A lateral displacement of the returned beam in the filter plane leads to a change of the distribution of the fractions of transmitted light components, as explained above referring to FIG. 2a. The components of the beam distributor 19 may be conglutinated, for example using an optical cement, and form a micro-optical component together with the segmented optical filter 100.

A segmented chromatic filter typically being composed of dielectric interference layers, not transmitted radiation would be reflected back into the system. The filter may be built up on an absorbing black glass with, e.g., 50% transmission. Upon dual pass through such an absorbing layer, disturbing reflections would then be suppressed by 6 dB, resulting in a 12 dB suppression in combination with the effect of the 50% beam splitter 17. Preferably, the main reflections are then directed into a light trap 20, for example constituted by an absorbing black glass conglutinated with the beam splitter 17.

For a further reduction of disturbing reflections, it is advantageous if the beam distributor 19 is positioned with a slight tilt with respect to an orthogonal entrance direction 55 of the probe beam and provided with an absorptive aperture.

Remaining effects of unwanted reflections may be compensated by a calibration of the optical monitoring system.

FIG. 6a shows schematically a possible configuration for combining the emission from different light sources using a multiplexer 120 and for spectrally separating with a de-multiplexer 130 a combined signal into spectral fractions for their individual detection.

The emission from four distributed feedback (DFB) laser diodes 111-114 emitting at wavelengths λ1-λ4, at a single longitudinal mode each, is spectrally combined with the multiplexer 120 and injected into a first single monomode fiber 117 which guides the spectrally combined light to a circulator 150.

Similarly, a spectrally combined light signal is guided from the circulator 150 by a second monomode fiber 118 to a de-multiplexer 130, where the light is spectrally separated and then directed to detectors 141-144 for individual detection.

For better detectability the laser light sources may be modulated. In order to discriminate a possible optical crosstalk in the de-multiplexer 130, the laser diodes 111-114 may be modulated at different frequencies. Then, only the signal with the associated modulation frequency is accounted for upon detection.

Dependent on the relative intensity noise (RIN) of the laser light sources, a monitoring of their emitted intensity may be necessary for purposes of noise compensation.

Some manufacturers of laser diodes integrate a monitor diode in the housing of a laser diode for the purpose of intensity control. Such an integrated monitor diode can also be used for RIN measurement, provided that the bandwidth of the monitor diode is large enough. Alternatively, a small fraction like 1% of the emitted power of the laser diode may be supplied to an external monitor diode for RIN control, using an asymmetric optical coupler. In signal processing for controlled noise compensation, possible delay of the monitor diode signal has to be accounted for.

The multiplexing and de-multiplexing configuration depicted in FIG. 6a can also be integrated into the configuration in combination with the optical sensor.

The emitted signal guided by optical fiber 117 and the received signal guided by optical fiber 118 can be in-coupled into and out-coupled out of an optical transmission fiber 119 by means of circulator 150.

FIG. 6b shows a variation of the configuration according to FIG. 6a which simplifies signal detection. Each of the four DFB lasers 111 to 114 has a different wavelength and is modulated at a different frequency, so that the different lasers may be identified spectrally and electrically. For signal detection, then only a single detector 145 is needed. The Fourier spectrum FT (FIG. 6c) of the detected electrical signal then shows four frequencies f1, f2, f3 and f4, the intensities or Fourier coefficients of which are dependent on the intensities of the individual spectral wavelengths. Upon an analogue or digital demodulation of the detected electrical signal, the four individual signals can be separated and analyzed. The signal strengths as shown in FIG. 6c are equivalent to the spectral intensity distribution.

In FIG. 7a and FIG. 7b are illustrated possible embodiments of a multiplexer or a de-multiplexer that can be used in combination with a configuration according to FIG. 6a.

Multiplexers are standard components in telecommunications and are typically manufactured as planar waveguides or by thin-film technology (TFF).

FIG. 7a shows a possible embodiment of a multiplexer/de-multiplexer 720 using beam splitters 717a-717d for combining a beam to be emitted as a probe beam, supplied from optical fiber collimators 711-714. The combined beam is directed to optical fiber collimator 719. A similar configuration can be used for de-multiplexing a combined beam into its spectral fractions of wavelengths λ1-λ4.

FIG. 7b illustrates an alternative embodiment of a multiplexer/de-multiplexer 820 comprising add/drop filters 831-833 for separating incoming light of combined wavelengths λ1-λ4 into its spectral components for detection by detectors 841-844, or for combining light from the laser diodes 811-814 to a common probe beam, using optical fiber couplers 821-824. Also such a configuration can be manufactured using standard telecommunication components.

FIG. 7c shows a configuration of a de-multiplexer 830 similar to the one depicted in FIG. 7b, but with a single super-luminescent light emitting diode 825 used as a light source instead of four DFB lasers. The polychromatic light coming from circulator 150 is separated into its spectral components λ1-λ4 by the de-multiplexer 830 comprising add/drop filters 831-833, for detection by detectors 841-844.

In FIG. 8 is illustrated a further possible embodiment of a segmented optical filter 300 as an optically decoding component. The filter 300 comprises two different chromatic filter segments 301 and 302, and is provided with a component or functionality to generate a locally in the filter plane varying deflection of the returned beam in a direction perpendicular to its direction of propagation. In the illustrated example, this effect is achieved by a varying thickness 303 of the filter, in this example concerning both segments of different spectral transmission, as shown in a cross-sectional side view of the segmented filter 300. As a consequence, the returned beam is deviated and transmitted, when passing through the filter, in a different way depending on its position of impingement on the filter. Thereby, the continuous lines in FIG. 8 indicate the beam path and the cross-section for the situation that the returned beam experiences no deflection due to a stylus bending or stylus tip displacement, whereas the dotted lines indicate the beam path and cross-section on the filter upon such stylus tip displacement or bending. The filter being positioned in the entrance pupil plane of the optical fiber collimator following in the optical beam path, a tilt of the wave front in this plane leads to a displacement of the in-coupling position in the entrance plane of the optical fiber and thus to change in the in-coupling efficiency. If the returned beam is displaced in a vertical direction (referring to an also vertical orientation of the filter entrance plane), the transmitted power in both spectral transmission paths or channels is changed simultaneously. A certain disadvantage of this configuration, therefore, is that a determination of the absolute (total) intensity of the spectral transmission is necessary.

Such a locally varying deflection of the returned beam may also be achieved by separate optical components additional to a segmented filter positioned in the beam path, which additional separate components will then be regarded as parts of the optically encoding component.

Optically encoding components as shown in FIG. 2a, FIG. 2b and FIG. 8 can also be combined with an additional optical "channel" or segment for transmission of signals from a distance measurement, such as an interferometric distance measurement, for determination of changes in the stylus length.

It would also be possible to design a segmented optical filter, e.g. with four segments as shown in FIG. 2a, in combination with a beam distributor as depicted in FIG. 5, for providing four segments for distinction of spectral light components ($\lambda 1, \lambda 2, \lambda 3, \lambda 4$; measurement of the intensities of the transmitted spectral fractions) and one of the four channels also for the determination of a phase change by an interferometric measurement.

In FIG. 9 is depicted a segmented polarization filter 500 as another possible embodiment of an optically decoding component. In such a system configuration, using polarization state instead of spectral range as a light component distinguishing feature, polarization-maintaining monomode fibers are required for light-guiding. It is preferred that the returned beam impinges in the plane of the segmented polarization filter 500 with 45° polarization. Segment 501 of filter 500 is designed for transmission of vertical polarization, segment 502 for horizontal polarization. Segment 503 is constituted by a quarter-wave plate. Using this optically encoding component, the information about the stylus position or bending is encoded in the three optical parameters vertical polarization, horizontal polarization and their phase relationship.

In FIG. 10 is illustrated a possible embodiment of a de-multiplexer having the functionality of a polarimeter setup for determining the polarization state of the returned beam. The returned beam is distributed by beam splitters 517a-517c for detection of the polarization states and the radiation phase by detectors 541-543.

An assembly comprising a stylus carrier 61, a stylus 62 and an optical monitoring system for a measurement configuration using a segmented chromatic filter as shown in FIG. 2a and a beam distributor as shown in FIG. 5, for use in combination with a tactile sensor, is illustrated in FIG. 11.

The main components of the optical monitoring system, not consuming electrical power and producing heat, are housed in the stylus carrier 61 connected with a stylus 62.

Spectrally distinguishable optical light components from one or more light sources (e.g. from several lasers or an SLED) are injected from a circulator 150 into a first optical fiber 117 preferably provided as a monomode fiber, which is connected to a first optical fiber collimator 71.

The probe beam is directed as a free optical beam towards the stylus tip provided with a retro-reflector 79 and a tactile sensor 80 designed to contact an object (not shown).

At least parts of the probe beam are reflected by the retro-reflector as a returned beam, the returned beam being subject to a displacement in case of displacement of the stylus tip or bending of the stylus. Following the direction of propagation, the returned beam then enters the beam distributor 19 comprising at least one beam splitter 17 provided with a light trap 20, e.g. absorbing black glass.

The light analyzed for the different spectral fractions of the returned beam is collected by optical fiber collimator 72 and launched into the second, preferably monomode fiber 118, from where it is guided to the circulator 150 and further directed to the optical transmission fiber 119, which may be coupled to an opto-mechanical interface.

FIG. 12 shows a configuration similar to the one depicted in FIG. 11 except for replacement of the circulator 150 by a fusion coupler 151 and two insulators 152, 153.

An assembly essentially similar to the one depicted in FIG. 11, comprising a stylus carrier 61, a stylus 62 and an optical monitoring system tailor-made for such a measurement configuration with, in combination, a beam distributor as depicted in FIG. 5, for providing four segments for distinction of spectral light components ($\lambda 1, \lambda 2, \lambda 3, \lambda 4$; measurement of the intensities of the transmitted spectral fractions), and one of the four channels also for the determination of a phase change by an interferometric measurement, is illustrated in FIG. 13.

The main components of the optical monitoring system, not consuming electrical power and producing heat, are housed in the stylus carrier 61 flexibly connected by a spring system 75 with a stylus 62. The spring system 75 is designed to allow for vertical displacement of the stylus with its tactile sensor tip, the vertical direction being understood as a Z axis perpendicular to a horizontal plane spanned by an X and a Y axis.

Spectrally distinguishable optical light components from one or more light sources (e.g. from several lasers or an SLED) are injected from a circulator 150 into a first optical fiber 117 preferably provided as a monomode fiber, which is connected to a first optical fiber collimator 71. The probe beam is directed as a free optical beam towards the stylus tip provided with a retro-reflector 79 and a tactile sensor 80 designed to contact an object (not shown).

At least parts of the probe beam are reflected by the retro-reflector as a returned beam, the returned beam being subject to a displacement and a change of the beam path in z-direction upon tactile contact with an object. Following the direction of propagation, the returned beam then enters the beam distributor 19 comprising at least one beam splitter 17 provided with a light trap 20, e.g. absorbing black glass.

The reflecting surface 21 of the beam splitter 17 and the light trap 20 are designed in such a way that, in this example, reflections from a segmented filter 100 are directed, concerning light components of three wavelengths, into the light trap where they are absorbed, whereas a light component associated with a fourth wavelength (e.g. λ1) is reflected by the reflecting surface 21 (e.g. provided with a spectrally selectively reflecting coating) and is brought into interference with the light component of this wavelength λ1 transmitted by the segmented filter 100. The use of the interferometric measurement principle for determination of changes of the optical path length due to displacement of the stylus in z-direction requires a sufficient coherence of the light emitted by the light source for wavelength λ1, what, however, can easily be fulfilled when using a DFB laser diode as a light source having a coherence length of several meters.

FIG. 14 illustrates a configuration using an optical sensor instead of a tactile sensor for the distance measurement. In most aspects, the setup is similar to the one of FIG. 11 or FIG. 13, also concerning the design of the beam distributor 19 and the segmented chromatic filter 100.

However, an optical probe 85 is used instead of a tactile sensor tip for providing a signal representing an optical distance measurement. This signal is transmitted from the optical probe 85 comprising an optical fiber collimator 86 by an optical fiber 88 to a wavelength division multiplexer (WDM) 89, e.g. designed for wavelengths around 1300 nm and around 1500 nm. The de-multiplexed signal is directed from the WDM into the optical transmission fiber 119, to be further guided, for example, to an opto-mechanical interface.

It has to be avoided that optical fiber 88 blocks or shadows the optical path of probe beam and returned beam of the monitoring system. Therefore, optical fiber 88, being directed at the inside of the stylus 62 from the wavelength demultiplexer (WDM) 89 to the optical probe 85 is attached by fixations 87a, 87b at an inside wall of the stylus 62.

Alternatively or as an additional means for separating the distance-measuring fiber 88 from the optical path of probe and returned beam, a stylus 62' provided as a double tubus 84 with a double inner wall for receiving optical fiber 88 may be used (FIG. 15).

FIG. 16 illustrates a surface sensing device with an optical sensor, the sensing device being provided with a rotary actuator (C axis), which is particular versatile for measuring internal bores, e.g. cylinders. The base design is similar to the setup shown in FIG. 14. In contrast, however, an optical probe 85' with rectangular beam deflection is provided.

The stylus 62 is connected to the stylus carrier 61 conveyed by the rotary actuator comprising a motor 90, decoders 91 for the motor rotation and a bearing 92. In order to allow rotation of the distance measuring optical fiber 88', the latter one is provided with a fiber coil 88'a.

A potential issue of this configuration is the axial impact, depending on angular position, rotational speed and orientation of the measuring head (horizontal or vertical, etc.). Upon integrating the rotary actuator in the stylus carrier 61 and using a hollow axle for guiding the probe beam/returned beam, a direct contacting of the probe tip (retro-reflector) is possible.

Based on the configuration illustrated in FIG. 16, displacements caused by bending of the stylus upon changes of rotation in the gravitational field, lateral acceleration and axial instabilities of the rotary axis can be accounted for. All these effects can together be determined and compensated.

FIG. 17a shows a variation of the configuration according to FIG. 16. This embodiment, based on use of an optical rotary coupler 93 for the optical fiber 88, is designed for allowing unlimited rotation of the stylus 62. The lower part of the rotary coupler 93 is connected and is rotatable together with stylus 62, whereas the upper part of rotary coupler 93 is stationary. A stationary prism-like beam deviator 95 is connected to the stylus 62. For allowing endless rotation, optical fiber 88 connected with the rotatable upper part of rotary coupler 93 must be directed free to move across the location of beam deviator 95. Such fiber lead-through 94 may be placed slightly aside of beam deviator 95 and the optical beam path of probe and returned beam. At a certain position, however, optical fiber 88 will cross the beam path. For this reason, a thin optical fiber, preferably with a diameter below 125 μm at least in the region of beam crossing, should be chosen in order to minimize shadowing of the beam. A satisfying precision for a determination of the beam position also in this region is possible upon a rotating calibration measurement.

As a further variation, the probe head—that is the stylus carrier 161 with the attached stylus 162—may be connected to a socket of the end of an arm of an articulated arm measuring machine or to of the Z-column of a bridge-type coordinate measuring machine, the socket acting as a holding means, conveyed by rotation axes 926, 927 providing rotary degree of freedom of the stylus carrier 161 with respect to the holding means. In FIG. 17b, an example is illustrated with two rotation axes providing freedom of rotation of the stylus carrier around two perpendicular axes. Such a configuration is particularly advantageous for scanning applications in order to follow precisely the surface of an object.

FIG. 18 shows a segmented chromatic filter with two segments dedicated for a combination, e.g., with a segmented chromatic filter as shown in FIG. 2a for a surface sensing device provided with 3-axes measurement capability.

Starting from known tactile measurement heads allowing distance measurements along the z-direction, besides scanning in the XY plane, a configuration of an optical monitoring system dedicated for tactile measurements with respect to all three axes X, Y, Z is presented.—For purely scanning tactile measurements such a 3-axes functionality of the optical monitoring system is not necessary.

Besides the solution exclusively based on optical measurements for 3-dimensional scanning presented in the following, a combination of an optical monitoring system for two axes (X and Y) with conventional, known electronic distance measurements, e.g. based on inductive sensors, is, of course, also possible.

The position of the stylus with respect to the Z direction is determined using a 90°-deviating beam splitter, perpendicular to the z-direction of motion (see FIG. 22). Thereby, the returned beam is directed onto a 2-segments filter 600 as part of an optically decoding component, the filter comprising two segments 105 and 106 of different, preferably non-overlapping spectral transmission.

The filter is preferably placed in the beam path of the returned beam in such a way that, without displacement upon interaction with an object, the returned beam has a mirror-symmetrical cross section 50 on the two filter segments. Upon displacement of the stylus in Z direction, the returned beam impinges on the 2-segmented filter with a lateral displaced beam cross section 50".

Preferably, the segments 105 and 106 of 2-segment filter 600 are selected in such a way that their spectral transmission windows accomplish the spectral range covered by the transmissions of a segmented chromatic filter as illustrated in FIG. 2a (see FIG. 19: spectral ranges around λ1 to λ4 covered by segments of segmented chromatic filter 100(X,Y), adjacent to spectral range (λ5, λ6) covered by the two segments of 2-segments filter 600(Z)).

In total six individual laser light sources may be used, with their emission wavelengths falling into the spectral ranges of the segmented chromatic filters as shown in FIG. 20. The emission wavelengths may vary within the intervals indicated by arrows.

Alternatively, again a super-luminescent light-emitting diode with a spectral emission band spanning the transmission windows of all six filter segments may be used (FIG. 21). FIG. 21 shows a typical spectral distribution of the light emitted by a super-luminescent light-emitting diode (SLED), with a bandwidth of typically about 10 nm.

FIG. 22 shows a possible configuration of a beam distributor 99 with beam splitters for use with a combination of segmented chromatic filters 100 and 600. The beam distributor 99 comprises beam-deviating prisms 96a, 96b, beam splitters 97a, 97b, 97c, and segmented chromatic filters 100, 600, the lower beam splitter 97a with an absorbing back side 98a, e.g. of black glass being attached to the upper stylus end movable in Z direction, whereas the other parts of beam distributor 99 are housed fixed in the stylus carrier 61.

The returned beam is split by e.g. 50% beam splitter 97a into two parts, one part propagating towards beam splitter 97b, also provided with an absorbing back side 98b and carrying segmented chromatic filter 100, the other part being directed over prism 96b to segmented chromatic filter 600.

Both beams, after spectral separation into light components, are combined by a chromatic beam splitter 97c to a common beam to be further guided together in one optical fiber ("OUT").

FIG. 23 illustrates a de-multiplexing configuration for use in combination with super-luminescent light-emitting diode 825', as shown in FIG. 7c, but now accomplished by two further spectral separation channels, using additional add/drop filters 834 and 835 for separating light components of wavelengths λ5 and λ6 to be detected by detectors 845 and 846.

An assembly comprising a stylus carrier 61, a stylus 62 and an optical monitoring system designed for optical measurement with respect to X, Y and Z direction is illustrated in FIG. 24. The configuration comprises a spring system 75 for allowing vertical displacement of the stylus 62 with its sensor tip 80, the vertical direction being understood as a Z axis perpendicular to a horizontal plane spanned by an X and a Y axis. The configuration is largely similar to the one shown in FIG. 13, with the difference of beam distributor 69 being replaced by beam distributor 99, which has been described in detail with reference to FIG. 22.

The main components of the optical monitoring system, not consuming electrical power and producing heat, are housed in the stylus carrier 61 flexibly connected by a spring system 75 with a stylus 62.

Spectrally distinguishable optical light components from one or more light sources (e.g. from several lasers or an SLED) are injected from a circulator 150 into a first optical fiber 117 preferably provided as a monomode fiber, which is connected to a first optical fiber collimator 71.

The probe beam is directed as a free optical beam towards the stylus tip provided with a retro-reflector 79 and a tactile sensor 80 designed to contact an object (not shown).

At least parts of the probe beam are reflected by the retro-reflector as a returned beam, the returned beam being subject to a displacement and a change of the beam path in z-direction upon tactile contact with an object. Following the direction of propagation, the returned beam then enters the beam distributor 99, the functionality of which having been described with reference to FIG. 22.

The different embodiments of surface sensing devices may also comprise, instead of a tactile sensor 80 as shown in FIG. 11 to FIG. 13 or an optical sensor 85 or 85' as shown in FIG. 14 to FIG. 17 or in FIG. 24, a combined optical-tactile sensor. Such an optical-tactile sensor may be provided like a spherical sensor tip of a typical tactile sensor, but the sphere being light-transmissive or having a perforation for light transmission.

As an example for a complete surface sensing device, FIG. 25 illustrates an articulated arm coordinate measuring machine (CMM) 900 equipped with a stylus 162 attached to a stylus carrier 161. The articulated arm CMM 900 comprises a base 920 which forms the support of the CMM and houses light sources 911 and detectors 941, as schematically indicated. Connected to the base 900 several arm-components are linked by joints, the arm-components being thus movable relative against each other. The optical components provided in the stylus carrier 161 and/or the stylus 162, as described above, are connected with the light sources 911 and the detectors 941 housed in the base 920 by optical fibers 917 and 918, as schematically shown.

As another example, a bridge-type CMM is shown in FIG. 26. The bridge-type CMM comprises two portal legs 921, 922 supporting a bridge 923 and an X-carriage 924 which can be driven along the bridge (X-direction).

A Z-column 925, movable in Z-direction, holds a stylus carrier 161 with an attached stylus 162.

The portal formed by the portal legs 921, 922 and the bridge 923 can be moved in Y-direction. Light sources and detectors housed e.g. in a CMM controller (not shown) are again connected by optical fibers with the components of the optical monitoring system provided in the stylus carrier 161 or the stylus 162, as shown above.

EXAMPLES/SIMULATIONS

For simulations the following parameters are chosen:
Fiber Parameter $$w_0 := 6.3 \ \mu m - 0.5 \quad \text{fiber core (Hi-Flex)}$$

$$\lambda := 1.55 \ \mu m \quad z_0 := \frac{\pi \cdot w_0^2}{\lambda} = 20.111 \cdot \mu m$$

Beam Parameters $$f := 3.8 \ mm \quad \text{focal length of collimating lens}$$

$$w_1 := \frac{f \cdot w_0}{z_0} = 0.595 \cdot mm \quad \text{behind the lens in the waist position(measurement bean}$$

$$z_1 := \frac{\pi \cdot w_1^2}{\lambda} = 718.006 \cdot mm \quad \text{Rayleigh range is equal to measurement range}$$

$$size := 4 \ mm \quad \text{propagating field dimension}$$

The probe beam has a diameter of 1.2 mm. The Rayleigh length of about 70 cm is larger than twice the measurement distance using a stylus of 30 cm length. Consequently, the beam can be presumed to be collimated over the whole length of free beam propagation. The measured intensity distribution of the light components of the returned beam, after passing a segmented chromatic filter as described with reference to FIG. 2a, is displayed in FIGS. 27a-27d.

The total area covered by the segmented filter (image size) is (4 mm)². As can be deducted from FIGS. 27a-27d, also evident from the unequal intensity distribution, the returned beam is displaced by 100 μm towards the bottom (FIG. 27c, FIG. 27d).

Using a retro-reflector 79 at the end of the stylus 61 (cf. FIG. 11), such a displacement by 100 µm corresponds to a stylus bending by 50 µm. (A possible tilt of the retro-reflector can be neglected).

The optical power transmitted by the 4 channels (filter segments) is:

$$P = \begin{pmatrix} 0.189 \\ 0.189 \\ 0.321 \\ 0.321 \end{pmatrix} \cdot mW$$

The launched optical power in the probe beam had been 1 mW in each of the four spectral light components. The transmission of the two lower channels is higher the one of the upper channels, due to the beam displacement.

In the further part of light propagation, the four beam parts (optical field) propagate independent on one another towards the lens of the optical fiber collimator (Grin lens) and further to the optical fiber:

propagation to lens $$z := f = 3.8 \cdot mm$$

$$\overrightarrow{Ff} := \overrightarrow{LPForvard\left(\frac{z}{m}, Ff\right)}$$

from lens to fiber(focussng)

$$f = 3.8 \cdot mm$$

$$\overrightarrow{Ff} := \overrightarrow{LPLensFresnel\left(\frac{f2}{m}, \frac{z}{m}, Ff\right)}$$

solving the Fresnel-Kirchoff diffration integral

FIG. 28 shows in its upper part the mode of the optical fiber, in a cross-sectional view. The two lower parts of FIG. 28 show intensity profiles in X and Y direction for one of the four free propagating partial beams.

In the optical fiber plane, there are no relevant deviations from symmetry, as illustrated by FIG. 29a-FIG. 29d showing photos of the intensity distribution of the four partial beams.

The segmented chromatic filter being located in the Fourier plane (entrance pupil plane of the optical fiber collimator), shadowing of the pupil does not lead to a beam displacement, but effects only the beam diameter and the phase. The beams are made symmetrical in the optical fiber plane.

The in-coupling efficiency is almost similar (about 27%) for all four partial beams:

$$C_r := \frac{\left\|\sum_i \left[\sum_j [(E_r)_{i,j} \cdot \overline{E_{Fiber_{i,j}}}]\right]\right\|^2}{\sum_i \sum_j [(E_r)_{i,j} \cdot \overline{(E_r)_{i,j}}] \sum_i \sum_j (E_{Fiber_{i,j}} \cdot \overline{E_{Fiber_{i,j}}})}$$

fiber coupling efficiency $\quad C = \begin{pmatrix} 27.173 \\ 27.173 \\ 26.82 \\ 26.82 \end{pmatrix} \cdot \%$ Upon a displacement of the beam by 100 µm, corresponding to a stylus bending of 50 µm, a contrast of 50% is obtained, as can be determined from an intensity calculation:

fiber coupled power $\quad P_{fiber} := \overrightarrow{(P \cdot C)} = \begin{pmatrix} 51.295 \\ 51.294 \\ 86.218 \\ 86.218 \end{pmatrix} \cdot \mu W$ $$\text{contrast} := \frac{\max(P_{fiber}) - \min(P_{fiber})}{\text{mean}(P_{fiber})} = 50.794 \cdot \%$$

Thus, the position of the returned beam is decoded in the intensity spectrum of the four optical channels as can be seen in FIG. 30 for the example of a beam displacement by 100 µm.

In another example, the returned beam is displaced in an oblique direction. Using a calibration factor, the position for x and y can be determined from the intensities (FIG. 31). The calibration is only linear in a first approximation, and for achieving a higher precision, two or three parameters should be used for calibration.

What is claimed is:

1. A surface sensing device comprising:
   a basis;
   a probe head for establishing and maintaining a contacting or contactless measurement connection to a surface to be measured, the probe head being moveably linked to the basis by at least one joint, wherein the probe head comprises a stylus carrier and a hollow stylus with a stylus tip; and
   an optical monitoring system for measuring a displacement of the stylus tip with respect to the stylus carrier, the optical monitoring system including:
      light emitting means for generating a beam to be directed inside the stylus towards the stylus tip, where at least parts of the beam are reflected as a returned beam propagating along an optical return path; and
      detector means for the returned beam being capable of generating an electrical output signal indicative of the displacement of the stylus tip, wherein:
      the light emitting means are built in such a way that the beam has at least two distinguishable light characteristics with a given characteristics distribution;
      the optical monitoring system further comprises an optically encoding component positioned in the stylus carrier in the optical return path and designed to transform the information of an impinging position of the returned beam upon the optical encoding component into a change in the distribution between fractions of the distinguishable light characteristics of the characteristics distribution of the returned beam;
      the detector means is sensitive for the at least two distinguishable light characteristics and built for generating the electrical output signal dependent on the changed characteristics distribution of the returned beam; and
      the optically encoding component is designed in such a way that the characteristics distribution of the returned beam is modified, wherein the modification varies dependent on the impinging position of the returned beam upon the optical encoding component, so that the returned beam with the modified characteristics distribution propagating from the optical encoding component to the detector means is indicative of the impinging position and thereof of the displacement of the stylus tip independent from an exact propagation pathway of the returned beam within the optical return path, so as to enable for optical waveguiding of the returned beam with the modified characteristics distribution to the detector means by an optical fiber without losing optical indication of the displacement of the stylus tip carried by the returned beam.

2. A surface sensing device according to claim 1, wherein:
the surface sensing device is provided as a coordinate measuring machine with an articulated arm, one end thereof forming the basis and the other end thereof comprising a socket for removeably attaching the probe head;
the light emitting means and the detector means are positioned outside the probe head; and
the beam generated by the light emitting means as well as the returned beam propagating from the optically encoding component to the detector means are waveguided in the articulated arm by optical fibers; or
the surface sensing device is provided as a bridge type coordinate measuring machine including:
  two portal legs, the portal legs being movably connected to the basis and supporting a bridge;
  an X-carriage movable along the bridge; and
  a Z-column being movably connected to the X-carriage and comprising a socket for removeably attaching the probe head.

3. A surface sensing device according to claim 2, wherein:
the light emitting means includes one or more laser light sources;
the detector means, includes one or more light detectors;
the light emitting means and the detector means are housed in the basis; and
the socket provides for a rotary degree of freedom of the probe head with respect to the Z-column or to the other end of the articulated arm, respectively.

4. A surface sensing device according to claim 1, wherein:
the at least two distinguishable light characteristics are given by light components of the generated beam having:
  different wavelengths or wavelength ranges and/or
  different polarization states, and the characteristics distribution is given by a proportion or fraction of each light component.

5. A surface sensing device according to claim 1, wherein the optically encoding component includes a segmented optical filter located in an entrance pupil plane of a second optical fiber collimator in the optical return path, the filter including at least two segments of different.

6. A surface sensing device according to claim 1, wherein the optically encoding component includes a segmented optical filter located in an entrance pupil plane of a second optical fiber collimator in the optical return path, the filter including at least two segments of different non-overlapping, transmission characteristics, wherein the segmented optical filter is a chromatic filter provided with spectrally non-overlapping transmission windows with spectral distance of 100 or 200 GHz, i.e. 0.8 nm or 1.6 nm in the C- and L-band, corresponding to the ITU norm of telecommunication.

7. A surface sensing device according to claim 1, wherein the optically encoding component comprises an optical refracting component for the returned beam capable of a locally in the receiving plane varying deflection of the returned beam in a direction perpendicular to the direction of propagation of the returned beam.

8. A surface sensing device according to claim 1, the hollow stylus having a stylus length, wherein the optically encoding component comprises a segment designed for signal transmission for an interferometric distance measurement for determining changes in the stylus length.

9. A surface sensing device according to claim 1, wherein the returned beam is directed to the optically encoding component after passing at least one beam splitter forming a beam distributor.

10. A surface sensing device according to claim 9, wherein the beam distributor is provided together with the optically encoding component as a micro-optical component that is glued together, said micro-optical component being provided with a light trap, with an absorbing black glass backside for reducing disturbing reflections of non-transmitted light.

11. A surface sensing device according to claim 1, wherein the optically encoding component is a segmented optical filter and is provided with segments with polarization-selective transmission.

12. A surface sensing device according to claim 11, further comprising a quarter wave plate enabling the determination of a phase relationship between the return beam paths of different polarization by using a polarimeter.

13. A surface sensing device according to claim 1, wherein the light emitting means is a multitude of laser light sources emitting at different wavelengths.

14. A surface sensing device according to claim 13, wherein:
the optical monitoring system is additionally provided with a multiplexer designed to spectrally combine the light of the different wavelengths from the multitude of laser light sources and to couple the combined light into a first optical fiber leaving the multiplexer;
the detector means is formed by multitude of detectors sensitive for the different wavelengths; and
the optical monitoring system is additionally provided with a de-multiplexer designed to spectrally separate the light of the returned beam into beam fractions of the different wavelengths for detection by the multitude of detectors.

15. A surface sensing device according to claim 1, wherein the light emitting means is a super-luminescent light-emitting diode particularly with an emission band of about 10 nm bandwidth, the spectral emission of which is separated in the returned beam by the optically encoding component into a plurality of partial beams of different wavelengths to be provided to the detector means.

16. A surface sensing device according to claim 1, wherein the light emitting means is a multitude of laser light sources emitting at different wavelengths and being modulated at different frequencies corresponding to multiple frequencies in a Fourier spectrum, and the detector means is sensitive for the distinguishable light characteristics, the individual signals being separable by analogue or digital demodulation.

17. A surface sensing device according to claim 1, wherein:
the probe head includes a tactile sensor for establishing and maintaining a contacting measurement connection to the surface to be measured; or
the probe head includes an optical-tactile sensor for establishing and maintaining a contacting measurement connection to the surface to be measured, the optical-tactile sensor comprising a light-transmissive sensor tip or a perforated sensor tip for light transmission; or
the probe head includes an optical sensor for establishing and maintaining a contactless measurement connection to the surface to be measured.

18. A surface sensing device according to claim 17, wherein the tactile sensor is provided with a retro- reflector.

19. A surface sensing device according to claim 17, wherein:

a rotary actuator is provided, the stylus being connected to the stylus carrier conveyed by the rotary actuator, and comprising a distance measuring fiber with a fiber coil, or it is provided with an optical rotary coupler for the monomode fiber designed for allowing unlimited rotation of the stylus, one part of the optical rotary coupler being connected and rotatable together with stylus, whereas another part of rotary coupler being stationary.

20. A surface sensing device according to claim 1, wherein it is provided with a 3-axes measurement capability, comprising:
an additional segmented chromatic filter provided with at least two segments of preferably spectrally non-overlapping transmission characteristics, and
a beam distributor with beam splitters for use with a combination of segmented optical filters, the beam distributor comprising beam-deviating prisms, beam splitters and segmented chromatic filters, a lower beam splitter being attached to an upper stylus end movable in Z-direction, whereas the other parts of beam distributor being housed fixed in the stylus carrier, wherein the returned beam is split by beam splitter into two parts, one part propagating towards beam splitter carrying a segmented chromatic filter, the other part being directed over prism to segmented chromatic filter.

21. A probe head for a surface sensing device according to claim 1, the probe head being formed for establishing and maintaining a contacting or contactless measurement connection to the surface to be measured, wherein the probe head comprises a stylus carrier and a hollow stylus with a stylus tip, wherein:
the probe head comprises means for receiving a beam having at least two distinguishable light characteristics with a given characteristics distribution from the surface sensing device waveguided by an optical fiber and means for coupling-out the beam of the optical fiber and directing it inside the stylus towards the stylus tip, where at least parts of the beam are reflected as a returned beam propagating along an optical return path;
an optically encoding component as part of an optical monitoring system for measuring a displacement of the stylus tip with respect to the stylus carrier, the optically encoding component being positioned in the stylus carrier in the optical return path and designed to transform the information of an impinging position of the returned beam upon the optically encoding component into a change of the characteristics distribution of the returned beam; and
means for coupling-in the returned beam having the changed characteristics distribution into an optical fiber, so as to enable for optical waveguiding of the returned beam in the surface sensing device.

22. A probe head according to claim 21, wherein the stylus carrier further comprising at least one of:
a circulator connected to a transmission fiber and to a first optical fiber and a second optical fiber for:
injection of the beam received from the transmission fiber into the first optical fiber connected to a first optical fiber collimator, and
injection of the returned beam being coupled-in into the second optical fiber by a second optical fiber collimator into the optical transmission fiber; and
a beam distributor comprising a beam splitter.

23. A monitoring method for a probe head of a surface sensing device, the probe head comprising a stylus carrier and a hollow stylus with a stylus tip, the monitoring method being designed for measuring a displacement of the stylus tip with respect to the stylus carrier, the monitoring method comprising:
directing a beam having at least two distinguishable light characteristics with a given characteristics distribution inside the stylus towards the stylus tip, where at least parts of the beam are reflected as a returned beam propagating along an optical return path,
transforming the information dependent on an impinging position of the returned beam upon an optically encoding component positioned in the stylus carrier in the optical return path into a change of the characteristics distribution of the returned beam;
detecting the at least two distinguishable light characteristics of the returned beam, and
determining the displacement of the stylus tip with respect to the stylus carrier dependent on the changed characteristics distribution of the returned beam.

24. A monitoring method according to claim 23, wherein after the step of transforming the returned beam is waveguided by an optical fiber.

25. A monitoring method according to claim 23, wherein the displacement of the stylus tip is determined in an X- and/or Y-direction with respect to the stylus carrier.

26. A monitoring method according to claim 23, wherein the displacement of the stylus tip is determined in an X- and/or Y-direction with respect to the stylus carrier, wherein the displacement of the stylus tip is determined additionally in a Z-direction by:
deflecting the returned beam dependent on the displacement in Z-direction before carrying out the step of transforming and then determining the displacement of the stylus tip also in Z-direction dependent on the changed characteristics distribution of the returned beam; or
using an electronic distance measurement system, in particular with an inductive sensor.

27. A surface sensing device comprising:
a basis;
a probe head for establishing and maintaining a contacting or contactless measurement connection to a surface to be measured, the probe head being moveably linked to the basis by at least one joint, wherein the probe head comprises a stylus carrier and a hollow stylus with a stylus tip; and
an optical monitoring system for measuring a displacement of the stylus tip with respect to the stylus carrier, the optical monitoring system including:
light emitting means for generating a beam to be directed inside the stylus towards the stylus tip, where at least parts of the beam are reflected as a returned beam propagating along an optical return path; and
detector means for the returned beam being capable of generating an electrical output signal indicative of the displacement of the stylus tip,
wherein:
the light emitting means are built in such a way that the beam has at least two distinguishable light characteristics with a given characteristics distribution;
the optical monitoring system further comprises an optically encoding component positioned in the stylus carrier in the optical return path and designed to modify the returned beam into a change of the characteristics distribution of the returned beam, wherein the modification varies dependent on the impinging position of the returned beam upon the optical encoding component;
the detector means is sensitive for the at least two distinguishable light characteristics and built for generating the electrical output signal dependent on the changed characteristics distribution of the returned beam.

* * * * *